US007200851B2

(12) United States Patent
Aoyama et al.

(10) Patent No.: US 7,200,851 B2
(45) Date of Patent: Apr. 3, 2007

(54) DISK DRIVE

(75) Inventors: Takashi Aoyama, Tokyo (JP); Hidekazu Seto, Tokyo (JP); Kiyoshi Omori, Tokyo (JP); Takeshi Kunishima, Kanagawa (JP)

(73) Assignee: Sony Corporation (JP)

( * ) Notice: Subject to any disclaimer, the term of this patent is extended or adjusted under 35 U.S.C. 154(b) by 449 days.

(21) Appl. No.: 10/930,942

(22) Filed: Sep. 1, 2004

(65) Prior Publication Data

US 2005/0060734 A1 Mar. 17, 2005

(30) Foreign Application Priority Data

Sep. 11, 2003 (JP) ............................ P2003-320303

(51) Int. Cl.
*G11B 17/04* (2006.01)

(52) U.S. Cl. .................................................... 720/706
(58) Field of Classification Search ................ 720/696, 720/706, 709, 710, 713, 715
See application file for complete search history.

(56) References Cited

U.S. PATENT DOCUMENTS 5,467,334 A * 11/1995 Kim ............................ 720/625
5,467,338 A * 11/1995 Song ........................... 720/706
5,596,561 A * 1/1997 Toyoguchi ................... 720/625

FOREIGN PATENT DOCUMENTS

| JP | 08-167209 | 6/1996 |
|----|-----------|--------|
| JP | 2003-16710 | 1/2003 |

* cited by examiner

*Primary Examiner*—Angel Castro
(74) *Attorney, Agent, or Firm*—Rader Fishman & Grauer PLLC; Ronald P. Kananen

(57) ABSTRACT

There is provided a disk drive in which a base lifting mechanism (93) makes a first disk chucking operation to place an optical disk (2) on a disk mount (27) by elevating at least a base (31) to a disk chucking position, lowers the base (31) to an intermediate position between the disk chucking position and a disk releasing position so that a disk rotation driving mechanism (28) spins the optical disk (2) which will thus take another phase, elevates the base (31) to the disk chucking position again, and makes a second disk chucking operation to place the optical disk (2) on the disk mount (27). Thus, the optical disk can positively be chucked onto the disk mount.

5 Claims, 29 Drawing Sheets

(1) POWER ON (2) LOAD

DISK DRIVE

BACKGROUND OF THE INVENTION

1. Field of the Invention

The present invention generally relates to a disk drive that makes write and/or read of information signals to and/or from an optical disk, and more particularly to a slot-in type disk drive into or from which an optical disk can be directly introduced or ejected through a disk slot.

This application claims the priority of the Japanese Patent Application No. 2003-320303 filed on Sep. 11, 2003, the entirety of which is incorporated by reference herein.

2. Description of the Related Art

Well-known conventional optical disks include purely optical type disks such as a CD (compact disk) and DVD (digital versatile disk), and magneto-optical type disks such as a MD (Mini Disk). Also, a variety of disk drives are available for use with such types of optical disks, respectively.

The disk drives include different types. In one of the typical types, a disk is settable directly onto a turn table which will be exposed and accessed from outside with a lid or door provided on a device housing being opened. In another typical disk drive, a disk is settable onto a disk tray which is moved horizontally into or out of a device housing, and the disk is automatically settable in place onto an internal turn table with the disk tray being brought deeper into the device housing. In a still another typical type, a disk is settable directly onto a turn table provided on a disk tray. With these types of disk drives, however, it is necessary to open and close the lid or door, bring the disk tray into or out of the device body or place the disk onto the turn table.

In addition, there is known a so-called slot-in type disk drive into which a disk, once inserted through a disk slot formed at the front side of a device housing, is automatically settable on a turn table. In this disk drive, a disk introduced through the disk slot is caught between a pair of guide rollers located opposite to each other and which are rotated in opposite directions. Thus, the disk can be brought into place in the housing (disk loading) through the disk slot, and can also be brought out of the housing through the disk slot (disk ejection).

There have been demands for smaller, lighter and thinner structures of portable type electronic devices such as a notebook-sized personal computer or the like in which a disk drive of the above-mentioned type and thus for correspondingly smaller, lighter and thinner structures of such a disk drive.

In the above-mentioned slot-in type disk drive, however, since the pair of guide rollers is larger than the diameter of the disk, the width of the entire disk drive will be larger. Also, since the disk is caught between the pair of guide rollers, the thickness of the disk drive will be larger. Therefore, the conventional slot-in type disk drive cannot be designed more compact and thinner.

To solve the above problem, there has been proposed a slot-in type disk drive designed to load a disk by bringing, into place in a device housing, an optical disk inserted through a disk slot by means of a plurality of pivot arms pivotable in cooperation with each other in a plane parallel to the optical disk, and eject the disk by bringing the optical disk through the disk slot to outside the device housing (cf. Japanese Patent Application Laid Open Nos. 167209/1996 and 2003-16710, referred to herein as "patent document Nos. 1 and 2", respectively).

The disk drive disclosed in the patent document No. 2 includes a base having a turn table surface on which a disk is to be placed. The base is elevated to place a disk brought in a device housing onto the turn table surface (disk chucking). In such a disk drive, however, it is possible that the disk will not be chucked appropriately onto the turn table in the disk chucking operation, and will have to be re-chucked.

OBJECT AND SUMMARY OF THE INVENTION

It is therefore an object of the present invention to overcome the above-mentioned drawbacks of the related art by providing a slot-in type disk drive in which an optical disk can positively be chucked onto a disk mount.

The above object can be attained by providing a disk drive including:

a device housing having formed at the front side thereof a disk slot through which an optical disk is to be loaded and removed;

a base unit having provided integrally on a base thereof:
  a disk mount on which the optical disk introduced into the device inside through the disk slot is to be set;
  a disk rotation driving mechanism that spins the optical disk placed on the disk mount;
  an optical pickup that writes and/or reads signals to and/or from an optical disk being spun by the disk rotation driving mechanism; and
  a pickup feeding mechanism that moves the optical pickup over the optical disk between the inner and outer circumference of the latter;

a disk transport mechanism including a plurality of pivotable members each having formed at the free end thereof an abutment that abuts the periphery of the optical disk introduced through the optical disk slot and pivotably supported at the base end thereof, the plurality of pivotable members loading the optical disk by bringing the optical disk introduced through the disk slot to a disk setting position where the optical disk is to be placed on the disk mount and ejecting the optical disk by bringing the optical disk to outside the device housing through the disk slot; and a base lifting mechanism that vertically moves the base between a disk chucking position where it will elevate the base to place the optical disk once set in the disk setting position onto the disk mount and a disk releasing position where it will lower the base to remove the optical disk from on the disk mount, the base lifting mechanism making a first disk chucking operation by elevating at least the base to the disk chucking position to place the optical disk on the disk mount, and a second disk chucking operation by lowering the base to an intermediate position between the disk chucking and releasing positions, rotating the optical disk by means of the disk rotation driving mechanism, shifting the optical disk to another phase, and then elevating the base again to the disk chucking position to place the optical disk on the disk mount.

In the above disk drive according to the present invention, after completion of the first disk chucking operation, the optical disk is shifted to another phase and the second disk chucking operation, which permits positive placement of the optical disk on the disk mount.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIG. 22 explains the operation of the base lifting mechanism, guide lifting mechanism and shutter operating mechanism, in which

FIG. 24 explains the operation of the base lifting mechanism, guide lifting mechanism and shutter operating mechanism, in which

FIG. 26 explains the operation of the base lifting mechanism, guide lifting mechanism and shutter operating mechanism, in which

DETAILED DESCRIPTION OF THE PREFERRED EMBODIMENTS

The disk drive according to the present invention will be described in detail below concerning the embodiments thereof with reference to the accompanying drawings.

Figure 1:
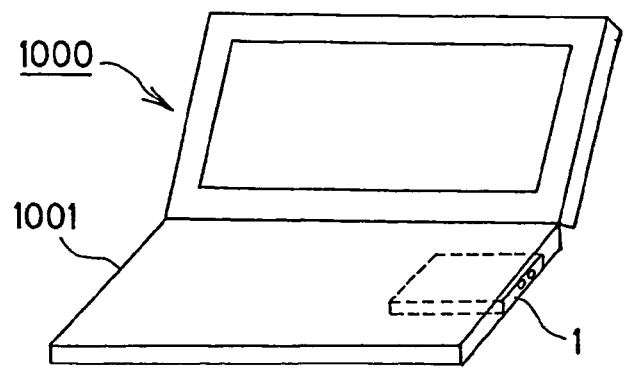
FIG. 1 is a perspective view showing the appearance of a notebook-sized personal computer in which the disk drive according to the present invention is installed.
Figure 2:
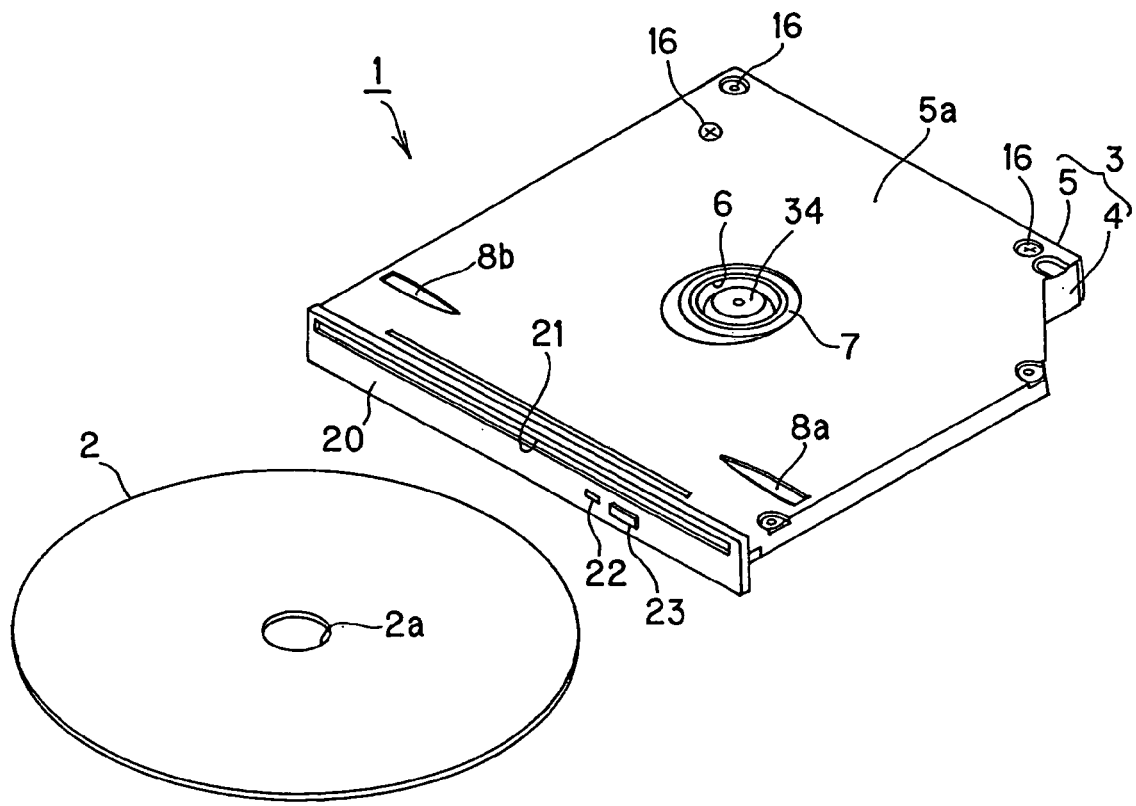
FIG. 2 is a perspective view showing the appearance of the disk drive according to the present invention.

The disk drive according to the present invention is a slot-in type one installed in a body 1001 of a notebook-sized personal computer 1000 as shown in FIG. 1 for example. The disk drive, generally indicated with a reference 1, has a structure designed as thin as about 12.7 mm, for example, as shown in FIG. 2. It can write and/or read information signals to and/or from an optical disk 2 such as a CD (compact disk) or DVD (digital versatile disk).

(1) Construction of the Disk Drive

The disk drive 1 is constructed as will first be described below.

(1-11) Construction of the Housing

Figure 3:
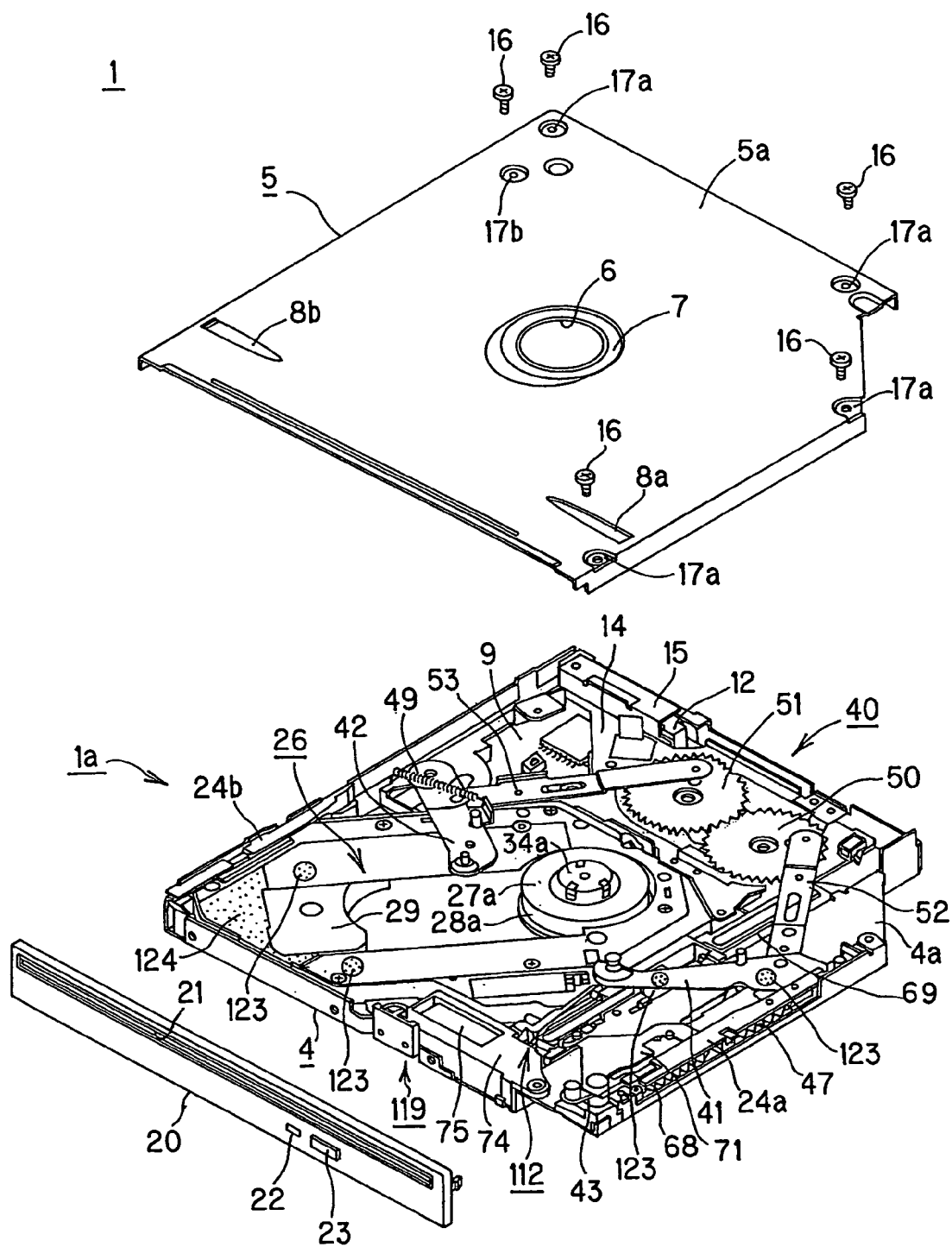
FIG. 3 is an exploded perspective view of the device body, top cover and front panel of the disk drive shown in FIG. 2.

As shown in FIGS. 2 and 3, the disk drive 1 includes a device body 1a and a housing 3 which is an outer case of the device body 1a. The housing 3 is formed from a bottom case 4 having the device body 1a installed thereto, and a top cover 5 that covers the upper side of the device body 1a.

Figure 4:
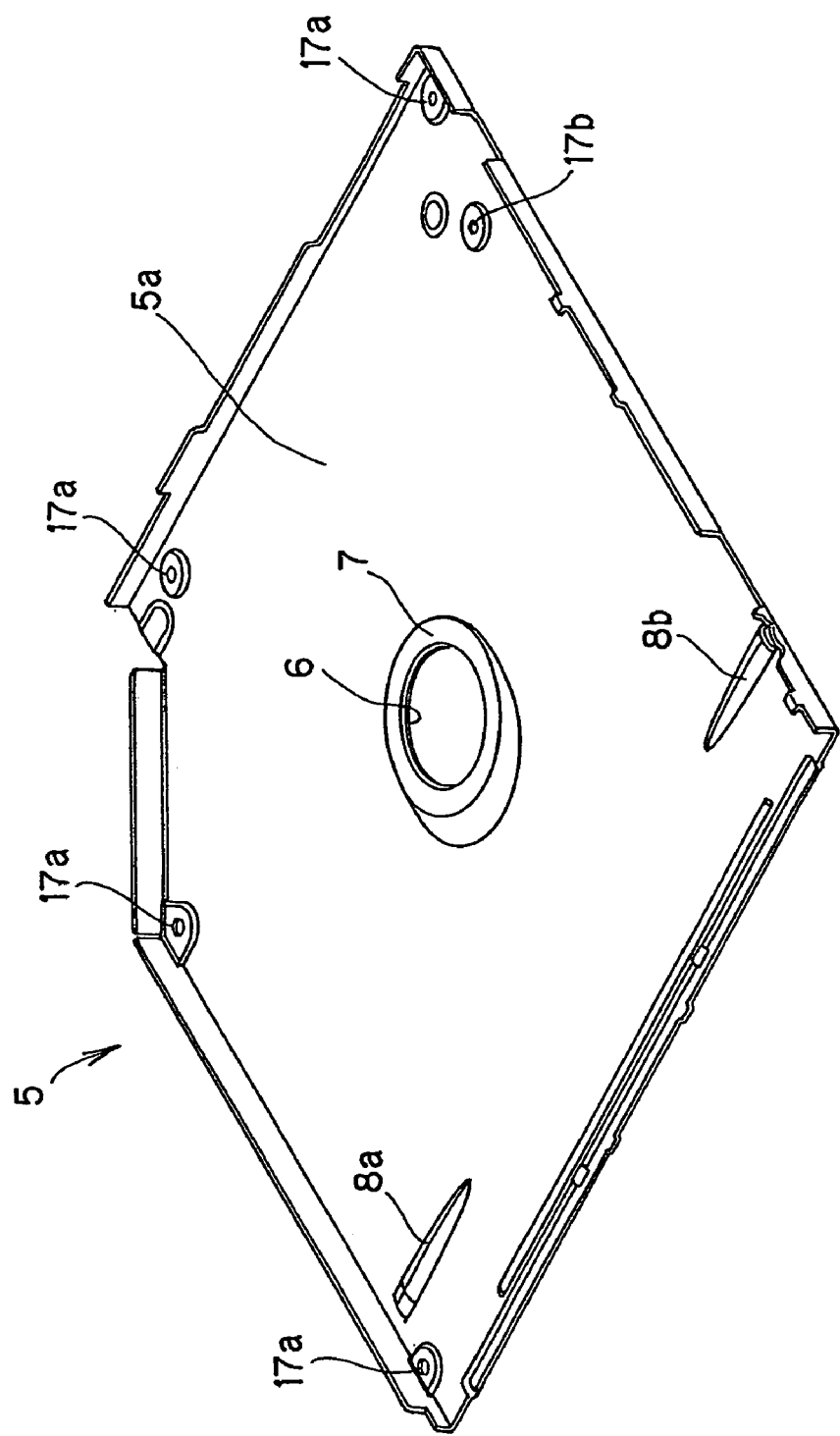
FIG. 4 is a perspective view, from inside, of the top cover shown in FIG. 3.

As shown in FIGS. 3 and 4, the top cover 5 includes a top plate 5a formed from a relatively thin metal sheet to close the upper opening of the bottom case 4. The top plate 5a has the marginal portion bent along the opposite lateral sides and rear side of the bottom case 4. The top plate 5a has a generally circular opening 6 formed nearly in the center thereof. An engagement protrusion 34a formed on a turn table 27a, which is to be engaged in a central hole 2a formed in the optical disk 2 is to be exposed to outside through the opening 6 during a disk chucking operation which will be described in detail later. There is formed along the periphery of the opening 6 an abutment projection 7 extending somewhat toward the inside of the housing 3 and which is to abut the periphery of the central hole 2a in the optical disk 2 held on the turn table 27a.

At the front of the top plate 5a, there is formed a pair of guide projections 8a and 8b extending inwardly of the housing 3 and which guides the optical disk 2 being introduced from a disk slot 21 which will be described in detail later while limiting the optical disk 2 from being directed vertically. The guide projections 8a and 8b are located in positions, respectively, generally symmetrical with respect to a center line passing through the opening 6 and extending along a direction in which the optical disk 2 is introduced, and each of them is formed like a part of a generally conical shape raised in the disk-introducing direction to depict a circular arc whose diameter is continuously reduced inwardly of the top plate 5a in a direction nearly perpendicular to the disk-introducing direction. That is, each of the pair of guide projections 8a and 8b has a shape which will result from the axial division of a cone. They has the apical ends directed to each other inwardly of the top plate 5a, and they are continuously lower and thinner inwardly of the top plate 5a.

Because of the above-mentioned shape, the pair of guide projections 8a and 8b can guide the optical disk 2 smoothly into the housing 3 while correcting any width-directional displacement of the optical disk 2 introduced through the disk slot 21. Also, because of the above-mentioned shape of the pair of guide projections 8a and 8b, the top cover 5 can increase the rigidity of the top plate 5a. It should be noted that the main inner side of the top plate 5a is processed to reduce the friction against the optical disk 2.

Figure 5:
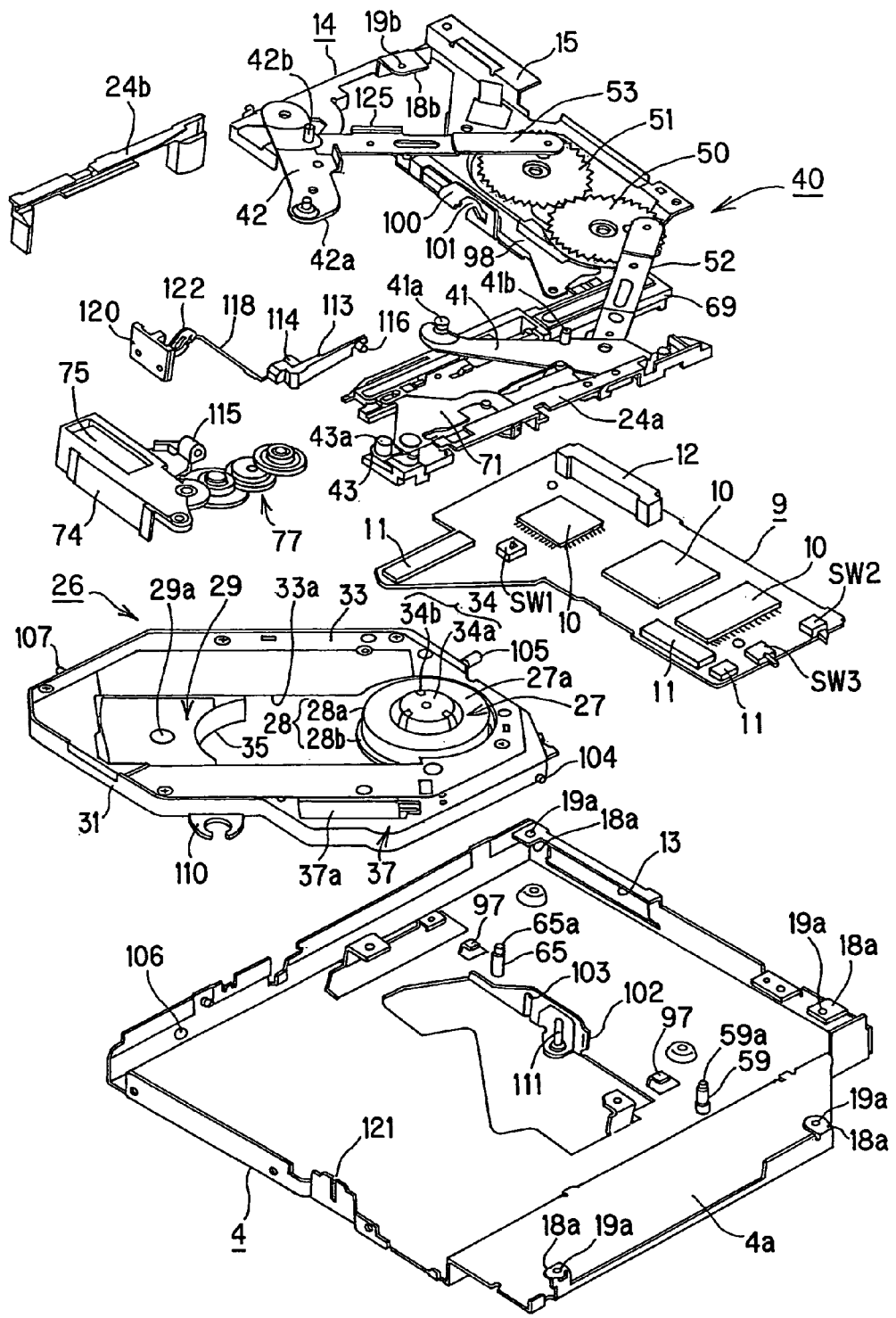
FIG. 5 is an exploded perspective view showing the construction of the device body shown in FIG. 3.
Figure 6:
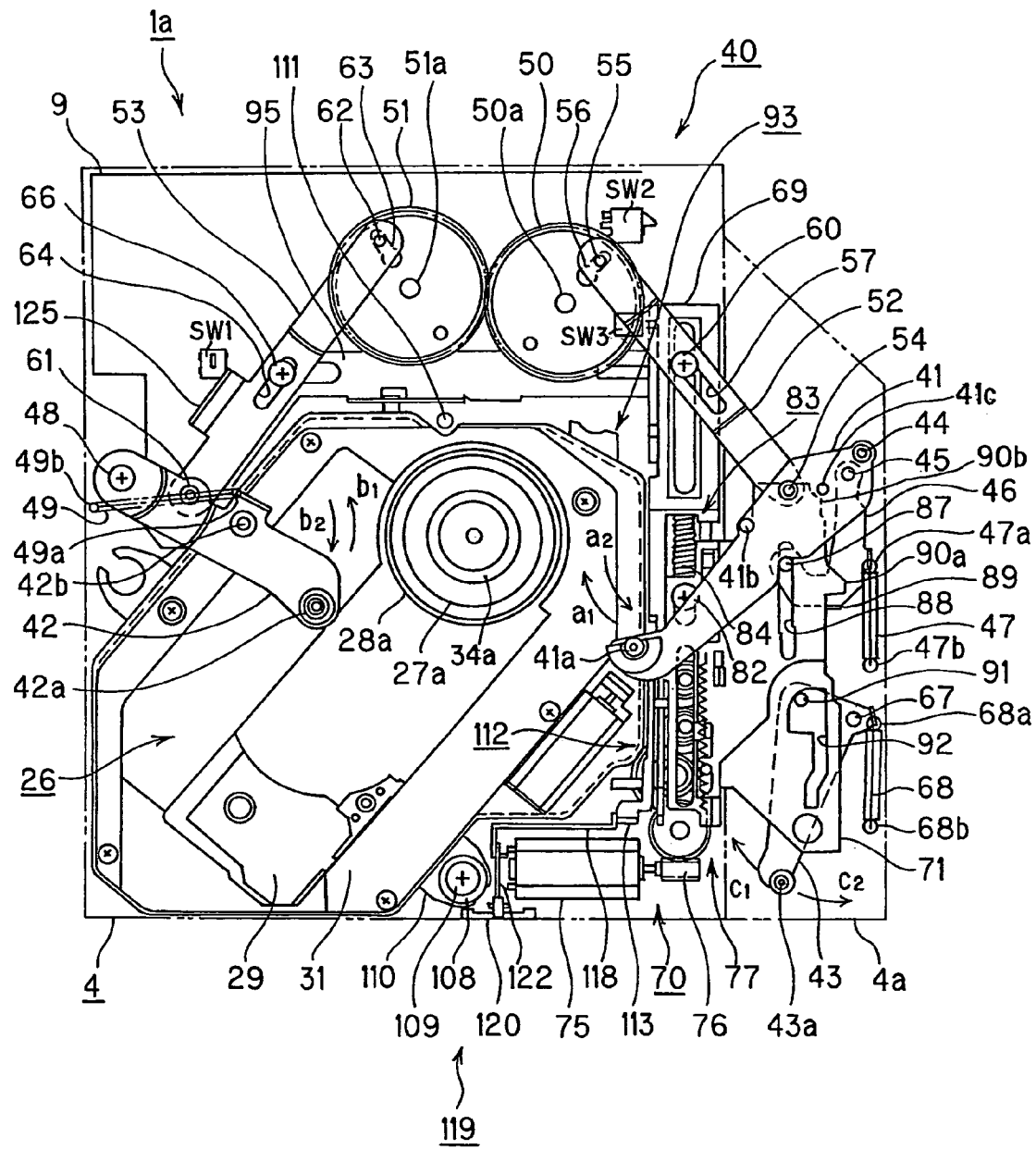
FIG. 6 is a plan view showing the construction of the device body.

As shown in FIGS. 3, 5 and 6, the bottom case 4 serves as a lower housing, and it is a generally flat box formed from a metal sheet. The bottom case 4 includes a generally rectangular bottom, and a deck portion 4a formed at one lateral side thereof. The deck portion 4a is higher than the bottom and extends outwardly.

Figure 7:
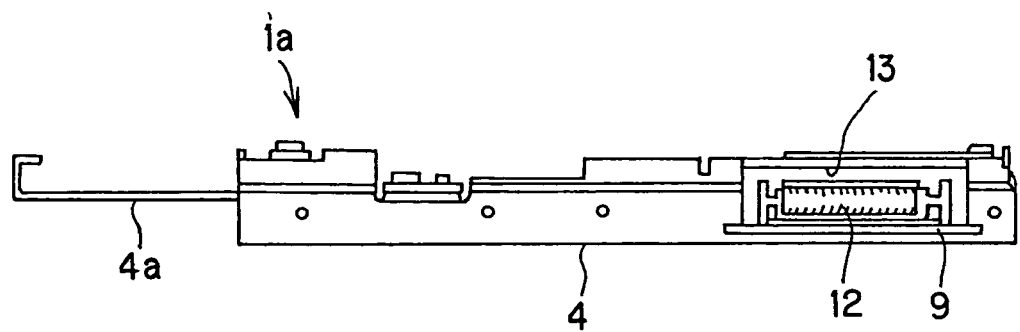
FIG. 7 is a rear view showing the construction of the device body.

The bottom case 4 has provided on the bottom a circuit board 9 having formed thereon a drive control circuit that controls the driving of various parts of the device body 1a. The circuit board 9 is fixed with screws to the rear-side bottom portion of the bottom case 4. The circuit board 9 has disposed thereon electronic parts 10 such as an IC chip etc. forming together the drive control circuit, connectors 11 for electrical connection of the various parts, detection switches SW1, SW2, SW3, etc. for detection of the operations of the various parts. Of these components, a connector 12 for electrical connection with the body 1001 of the personal computer 1000 is mounted on the circuit board 9 so as to be accessed from outside an opening 13 formed in the rear side of the bottom case 4 as shown in FIG. 7.

Also, a chassis 14 is fixed with screws to the bottom side of the bottom case 4. The chassis 14 is disposed above the circuit board 9 to vertically divide the inside of the bottom case 4 at a height generally equal to that of the deck portion 4a. Also, the chassis 14 has an enclosure 15 that encloses the external-connection connector 12. The enclosure 15 is formed by bending the chassis 14 along the contour of the connector 12. Thus, the enclosure 15 prevents invasion of dust or similar foreign matter into the housing 3 from the opening 13 in the bottom case 4 through which the external-connection connector 12 can be accessed from outside, while holding the external-connection connector 12, which improves the strength with which the external-connection connector 12 is fixed to the circuit board 9.

The top cover 5 is fixed with screws to the bottom case 4 and chassis 14. More particularly, on the peripheral portion of the top plate 5a, there are formed a plurality of first through-holes 17a in which screws 16 are introduced, as shown in FIGS. 3 and 4. A second through-hole 17b is formed in the peripheral portion of the top plate 5a in a position inner than the first through-holes 17a. A screw 16 is inserted in this through-hole 17a. On the other hand, there is formed on the peripheral portion of the bottom case 4 a plurality of first fixing pieces 18a bent inwardly, as shown in FIGS. 3 and 5. Each of these first fixing pieces 18a has formed therein a first screw hole 19a corresponding to the first through-hole 17a in the top cover 5. The chassis 14 has a second fixing piece 18b formed upward and having the free end thereof bent horizontally at the height of the first fixing pieces 18a. The second fixing piece 18b is located inside the periphery of the bottom case 4 and outside the periphery of the optical disk 2 positioned in the disk setting position which will be described in detail later. The second fixing piece 18b has formed in the free end portion thereof a second screw hole 19b corresponding to the second through-hole 17b in the top cover 5.

In this disk drive 1, the housing 3 is assembled by driving the screws 16 into the first through-holes 17a and second through-hole 17b in the top cover 5 and first screw holes 19a in the bottom case 4 and second screw hole 19b in the chassis 14 with the upper opening in the bottom case 4 being closed to the top plate 5a of the top cover 5. Thus, the housing 3 can prevent invasion of dust or similar foreign matter into the device body 1a. It should be noted that a cover seal (not shown) will be attached to the top plate 5a of the top cover 5 to cover the opening 6 for preventing invasion of dust or similar foreign matter from the opening 6.

Also, in the housing 3, the top cover 5 may be fixed with a screw to the second fixing piece 18b on the chassis 14, provided inside the plurality of first fixing pieces 18a, in addition to being fixed to the first fixing pieces 18a provided on the peripheral portion of the bottom case 4, so that it will not interfere with the optical disk 2 inserted in the housing 3 but can rather have the rigidity thereof increased.

At the front of the housing 3, there is attached a generally rectangular front panel 20 as shown in FIGS. 2 and 3. The front panel 20 has formed therein a disk slot 21 through which the optical disk 2 is horizontally introduced into, and taken out of, the housing 3. Namely, the optical disk 2 can be inserted into the housing 3 through the disk slot 21 or ejected to outside the housing 3 through the disk slot 21. Also at the front side of the front panel 20, there are provided an indicator 22 which illuminates to indicate that the optical disk 2 is being accessed and an eject button 23 which is to be pressed for ejection of the optical disk 2.

On the opposite lateral sides, near the front, of the bottom case 4, there are provided a plurality of guide members 24a and 24b which guide the optical disk 2 introduced through the disk slot 21 by limiting the optical disk 2 from being directed vertically and horizontally.

Figure 9A:
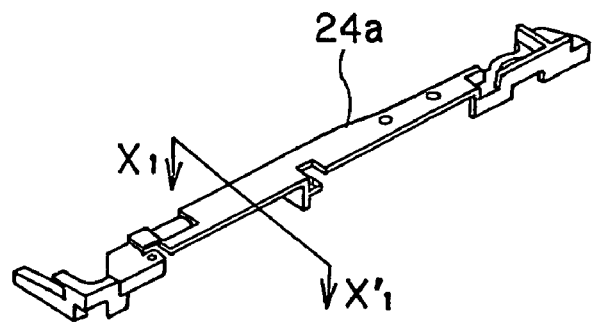
FIG. 9A is a perspective view, from above, of one of the guide members.
Figure 9B:
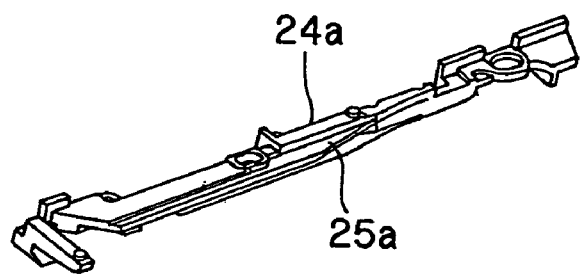
FIG. 9B is a perspective view, from below, of the guide member.
Figure 9C:
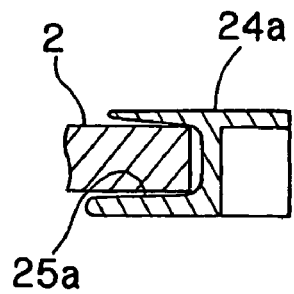
FIG. 9C is a sectional view, taken along the line $X_1$–$X_1'$, of the guide member.

Of the pair of guide members 24a and 24b, one (24a) is a long resin-made member with less friction against the optical disk 2 as shown in FIGS. 3, 5 and 9. It is installed along the upper side of the deck portion 4a. A guide recess 25a, extending in the direction in which the optical disk 2 is inserted, is formed on the side of the deck portion 4a opposite to the upper side on which the guide member 24a is installed. The guide recess 25a has the inner wall thereof inwardly curved to have a point contact with the periphery of the optical disk 2.

Figure 10A:
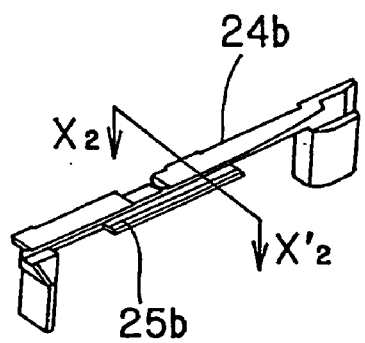
FIG. 10A is a perspective view, from above, of the other one of the guide members.
Figure 10B:
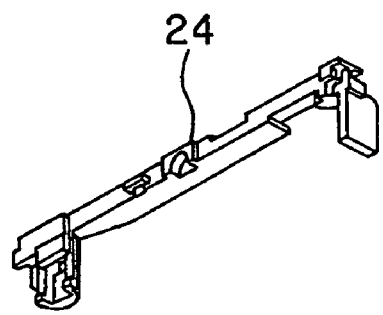
FIG. 10B is a perspective view, from below, of the guide member.
Figure 10C:
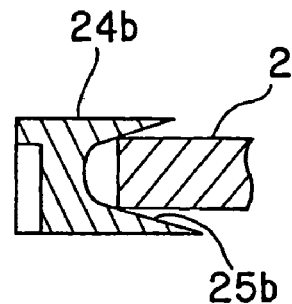
FIG. 10C is a sectional view, taken along the line $X_2$–$X_2'$, of the guide member.

Similarly to the guide member 24a, the other guide member 24b is a long resin-made member with less friction against the optical disk 2 as shown in FIGS. 3, 5 and 10. It is installed along the lateral side of the bottom case 4, opposite to the deck portion 4a. Also, a guide recess 25b extending in the direction in which the optical disk 2 is introduced is formed on the lateral side opposite to the side where the guide member 24b is installed. The guide member 25b has the inner wall thereof inwardly curved to have a point contact with the periphery of the optical disk 2.

Since in the pair of guide members 24a and 24b, the guide recesses 25a and 25b have their inner walls thereof shaped to be put in sliding point contact with the periphery of the optical disk 2, the area of contact with the periphery of the optical disk 2 can be reduced, which will contribute, along with the limitation of the vertical and horizontal movement of the optical disk 2 introduced through the disk slot 21, to an appropriate and smooth guiding of the optical disk 2.

More specifically, in the disk drive 1 according to the present invention, even an optical disk 2 formed from two disk substrates joined, with an adhesive, to each other such as a DVD, introduced through the disk slot 21, can be brought into place in the housing 3 (disk loading operation) through the disk slot 21 and also brought out of the housing 3 through the disk slot 21 (disk ejecting operation) without being adversely affected by the adhesive, if any, projecting out from the periphery of the optical disk 2.

Note that the inner wall of the guide recesses 25a and 25b in the pair of guide members 24a and 24b is not limited in shape to the above-mentioned inward curving but may be curved outwardly, shaped as a part of a polygon inclined inwardly, for example, or shaped otherwise so long as such other shapes allow a point contact with the periphery of the optical disk 2.

(1-2) Construction of the Base Unit

The device body 1a includes a base unit 26 provided on the bottom of the bottom case 4 to form the drive body as shown in FIGS. 3, 5, 6 and 11.

The base unit 26 includes a disk mount 27 on which the optical disk 2 inserted into the housing 3 through the disk slot 21 is to be placed, a disk rotation driving mechanism 28 that spins the optical disk 2 placed on the disk mount 27, an optical pickup 29 that writes or reads signals to or from the optical disk 2 being rotated by the disk rotation driving mechanism 28, and a pickup feeding mechanism 30 that moves the optical pickup 29 over the optical disk 2 between the inner and outer circumferences of the latter. The components are mounted integrally on a base 31 to achieve an ultra-thin structure of the base unit 26.

The base unit 26 is disposed before the circuit board 9 and chassis 14 so that the disk mount 27 is positioned nearly in the center of the bottom of the bottom case 4. Also, the base unit 26 can be moved vertically by a base lifting mechanism 93 which will be described in detail later, and is initially positioned below the optical disk 2 introduced into the housing 3 through the disk slot 21.

The base 31 is formed by punching a metal sheet into a predetermined shape and bending the peripheral portion of the punched metal sheet a little downward. The base 31 has formed in the main side thereof a generally semi-circular opening 32a through which the turn table 27a of the disk mount 27, which will further be described later, is exposed upward, and a generally rectangular opening 32b through which an objective lens 29a of the optical pickup 29, which will be described in detail later, is exposed upward. The openings 32a and 32b are thus formed contiguously to each other. It should be noted that to the upper side of the base 31, there is fixed a decorative plate 33 having formed therein an opening 33a corresponding to the openings 32a and 32b.

The disk mount 27 includes the turn table 27a which is driven to spin by the disk rotation driving mechanism 28. The turn table 27a has formed in the center thereof a disk chucking mechanism 34 that chucks the optical disk 2. The disk chucking mechanism 34 includes an engagement protrusion 34a which is to be engaged into the central hole 2a in the optical disk 2, and a plurality of engagement claws 34b which are engaged on the periphery of the central hole 2a in the optical disk 2, in which the engagement protrusion 34a is engaged. Thus, the disk chucking mechanism 34 holds the optical disk 2 on the turn table 27a.

The disk rotation driving mechanism 28 includes a flat spindle motor 28a to rotate the turn table 27a and thus the optical disk 2. The spindle motor 28a is screwed to the bottom of the base 31 with a support plate 28b placed between them so that the turn table 27a slightly projects from an opening 32a formed in the base 31.

The optical pickup 29 is an optical block in which a light beam emitted from a semiconductor laser as a light source is focused by an objective lens 29a onto a signal recording layer of the optical disk 2 and a return light from the signal recording layer of the optical disk 2 is detected by an optical detector formed from a photosensor etc. Thus, the optical pickup 29 writes or reads signals to or from the optical disk 2. Also, the optical pickup 29 includes a biaxial actuator to move the objective lens 29a in a focusing direction parallel to the optical axis of the objective lens 29a and a tracking direction perpendicular to the optical axis of the objective lens 29a. Thus, the optical pickup 29 controls the focusing and tracking of the objective lens 29a in relation to the optical disk 2 on the basis of a detection signal from the optical disk 2, detected by the optical detector.

The pickup feeding mechanism 30 includes a pickup base 35 having the optical pickup 29 installed thereon, a pair of guide shafts 36a and 36b to support the pickup base 35 slidably radially of the optical disk 2, and a pickup base movement driving mechanism 37 for moving the pickup base 35 supported on the pair of guide shafts 36a and 36b radially of the optical disk 2.

The pickup base 35 has formed thereon a pair of guide pieces 38a and 38b each having formed therein a guide hole through which one of the guide shafts 36a and 36b in pair extends, and a guide piece 39 having formed therein a guide recess that receives the other guide shaft 36b. The pair of guide shafts 36a and 36b and guide piece 39 are projected in opposite directions. Thus, the pickup base 35 is slidably supported on the pair of guide shafts 36a and 36b.

The pair of guide shafts 36a and 36b is positioned on the bottom of the base 31 in parallel to the radius of the optical disk 2, and guides, over the optical disk 2 between the inner and outer circumferences of the latter, the pickup base 35 having the objective lens 29a which is exposed through the opening 32b in the base 31.

The pickup base movement driving mechanism 37 converts the rotation of a drive motor 37a installed to the base 31 into a linear movement via a gear and rack (not shown) to move the pickup base 35 along the pair of guide shafts 36a and 36b, namely, radially of the optical disk 2. It should be noted that in the base unit 26, the optical pickup 29 is initially positioned on the outer circumference in the disk-radial direction.

(1-3) Construction of the Disk Transport Mechanism

As shown in FIGS. 3, 5 and 6, the device body 1a includes a disk transport mechanism 40 that carries the optical disk 2 between a disk insertion/ejection position where the optical disk 2 is to be inserted or ejected through the disk slot 21 and a disk setting position where the optical disk 2 is to be set on the turn table 27a of the disk mount 27.

The disk transport mechanism 40 includes first to third pivot arms 41 to 43 located below the optical disk 2 which is introduced into the housing 3 from the disk slot 21. The first to third pivot arms 41 to 43 can be oscillated in a plane parallel to the optical disk 2.

The first pivot arm 41 is a long flat member. It is located either at the right or the left (at the right, for example) across the turn table 27a of the disk mount 27, and supported by a spindle 44 whose base end is provided on the deck portion 4a to be pivotable in the directions of arrows $a_1$ and $a_2$. Also, the first pivot arm 41 has provided at the free end thereof a first abutment pint 41a projecting upward and which will abut, from the rear, the periphery of the optical disk 2 introduced through the disk slot 21. Also, the first pivot arm 41 has provided at the middle thereof a first positioning pin 41b projecting upward and which will abut the periphery of the optical disk 2 from the rear along with the first abutment pin 41a for placing the optical disk 2 in the disk setting position.

Figure 8:
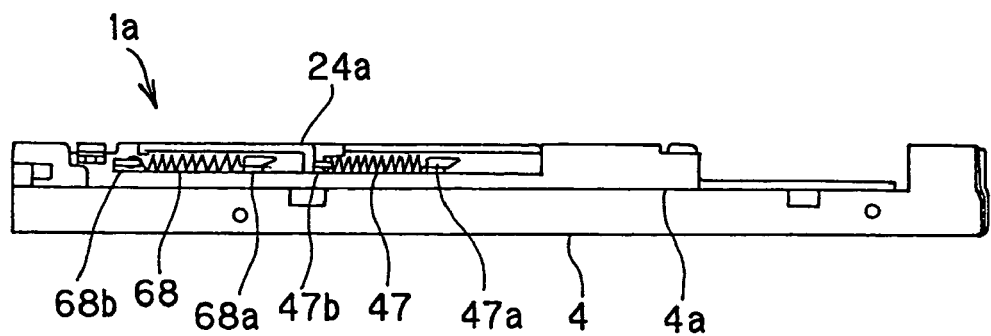
FIG. 8 is a side elevation showing the construction of the device body.

Also, the first pivot arm 41 has installed pivotably at the base end thereof an intermediate arm 46 via a spindle 45. The intermediate arm 46 is formed from a generally J-shaped flat member. A first helical tension spring 47 is hooked at one end 47a thereof to the middle of the intermediate arm 46. Also, the other end 47b of the helical tension spring 47 is hooked to the lateral side of the deck portion 4a as shown in FIGS. 6 and 8. Therefore, the first pivot arm 41 is forced by the first tension spring 47 in a direction in which it will be pivoted forward and also by the intermediate arm 46 in the direction of arrow $a_2$.

As shown in FIGS. 3, 5 and 6, the second pivot arm 42 is also a long flat member. It is located at one of the right and left (at the left, for example) across the turn table 27a of the disk mount 27, and supported by a spindle (screw) 48 having a base end provided on the chassis 14 to be pivotable in the directions of arrows $b_1$ and $b_2$. Also, the second pivot arm 42 has provided at the free end thereof a second abutment pin 42a projecting upward and which will abut, from the rear, the periphery of the optical disk 2 introduced through the disk slot 21. Also, the second pivot arm 42 has provided at the middle thereof a second positioning pin 42b projecting upward and which will abut the periphery of the optical disk 2 from the rear in cooperation with the second abutment pin 42a for placing the optical disk 2 in the disk setting position.

Also, a second helical tension spring 49 is hooked at one end 49a thereof to the middle of the second pivot arm 42. Also, the other end 49b of the helical tension spring 49 is hooked to the chassis 14. Therefore, the second pivot arm 42 is forced by the second tension spring 49 in a direction in which it will be pivoted forward, namely, in the direction of arrow $b_2$. Also, as the second pivot arm 42 is pivoted from the front toward the rear, the second tension spring 49 will change the direction of forcing the second pivot arm 42 from the forward-pivoting direction to a rearward-pivoting direction, that is, from the direction of arrow $b_2$ to the direction of arrow $b_1$. Reversely, as the second pivot arm 42 is pivoted from the rear to the front, the second tension spring 49 will change the direction of pivoting, forcing the second pivot arm 42 from the rearward-pivoting direction to the forward-pivoting direction, namely, from the direction of arrow $b_1$ to the direction of arrow $b_2$.

The first and second pivot arms 41 and 42 are located nearly symmetrically with respect to the turn table 27a of the disk mount 27. They are initially positioned in such a generally inverted-V geometry that their free ends are in an inner position with respect to the base ends while their free ends are being in front of the base ends.

Also, the disk transport mechanism 40 includes, for a coupling between the first and second pivot arms 41 and 42, a first gear 50 and second gear 51 being in mesh with each other, a first coupling arm 52 to couple the first gear 50 and first pivot arm 41, and a second coupling arm 53 to couple the second gear 51 and second pivot arm 42.

The first and second gears 50 and 51 are pivotably installed with spindles 50a and 51a, respectively, in positions generally symmetrical with respect to a center line passing through the turn table 27a on the chassis 14 and extending along a direction in which the optical disk 2 is introduced.

The first coupling arm 52 is a long flat member. It is pivotably installed at one end thereof with a spindle 54 to the first pivot arm 41. It has an engagement pin 55 projecting downward from the other end. The engagement pin 55 is engaged in an engagement hole 56 formed in the main side of the first gear 50 to couple the first pivot arm 41 and first gear 50. Also, the first coupling arm 52 has formed therein an elongated guide slit 57 extending longitudinally thereof. On the other hand, the bottom case 4 has provided on the bottom thereof an upright guide shaft 59 which is inserted in the guide slit 57 as shown in FIG. 5. The guide shaft 59 has a screw hole 59a formed in the free end thereof. With the guide shaft 59 inserted in the guide slit 57 and a screw 60 inserted in the screw hole 59a formed in the free end of the guide shaft 59 as shown in FIG. 6, the middle portion of the first coupling arm 52 is supported movably within a range the guide shaft 59 slides in the guide slit 57. Thus, the first coupling arm 52 permits rotation of the first gear 50 correspondingly to the pivoting of the first pivot arm 41 (or pivoting of the first pivot arm 41 correspondingly to the pivoting of the first gear 50).

Similarly, the second coupling arm 53 is a long flat member. It is pivotably installed at one end thereof with a spindle 61 to the second pivot arm 42. It has an engagement pin 62 projecting downward from the other end. The engagement pin 62 is engaged in an engagement hole 63 formed in the main side of the second gear 51 to couple the second pivot arm 42 and second gear 51. Also, the second coupling arm 53 has formed therein an elongated guide slit 64 extending longitudinally thereof. On the other hand, the bottom case 4 has provided on the bottom thereof an upright guide shaft 65 which is inserted in the guide slit 64 as shown in FIG. 5. The guide shaft 65 has a screw hole 65a formed in the free end thereof. With the guide shaft 65 inserted in the guide slit 64 and a screw 66 inserted in the screw hole 65a formed in the free end of the guide shaft 65 as shown in FIG. 6, the middle portion of the second coupling arm 53 is supported movably within a range the guide shaft 65 slides in the guide slit 64. Thus, the second coupling arm 53 permits rotation of the second gear 51 correspondingly to the pivoting of the second pivot arm 42 (or pivoting of the second pivot arm 42 correspondingly to the pivoting of the second gear 51).

As above, since the first and second gears 50 and 51 are in mesh with each other, when one of the gears rotates in one direction, the other gear will rotate in the opposite direction. That is, the first and second gears 50 and 51 will rotate in opposite directions in synchronization with each other. Therefore, the first and second pivot arms 41 and 42 can be oscillated by the aforementioned mechanism in opposite directions in synchronization with each other.

As shown in FIGS. 3, 5 and 6, the third pivot arm 43 is also a long flat member. It is located at one of either the right and left (at the right, for example) across the turn table 27a of the disk mount 27 and before the first pivot arm 41, and supported by a spindle 67 whose base end is provided on the deck portion 4a to be pivotable in the directions of arrows $c_1$ and $c_2$. Also, the third pivot arm 43 has provided at the free end thereof a third abutment pin 43a projecting upward and which will abut the periphery of the optical disk 2 introduced through the disk slot 21.

Also, a third helical tension spring 68 is hooked at one end 68a thereof to the base end of the third pivot arm 43 as shown in FIGS. 6 and 8. It is hooked at the other end 68b to the lateral side of the deck portion 4a. Therefore, the third pivot arm 43 is forced in a direction in which it will be pivoted rearward by the third helical tension spring 68, that is, in the direction of arrow $c_1$. It should be noted that the third pivot arm 43 is initially positioned in such a geometry that its free end is in an inner position with regards to its base end while the free end is in front of the base end.

In the disk transport mechanism 40, the first to third pivot arms 41 to 43 cooperate with each other to carry the optical disk 2 introduced from the disk slot 21 in the housing 3 to the disk setting position where the optical disk 2 will be set on the disk mount 27 (disk loading operation), to place the optical disk 2 in the disk setting position (disk centering operation), and to eject the optical disk 2 to outside the housing 3 through the disk slot 21 (disk ejecting operation).

Also, for loading, centering and ejection of the optical disk 2 by the first to third pivot arms 41 to 43, the disk transport mechanism 40 includes a driving lever 69 as a sliding member which is slidable back and forth, a driving lever movement driving mechanism 70 that moves the driving lever 69 back and forth, and a moving plate 71 as a second sliding member which is slidable back and forth in synchronization with the sliding of the driving lever 69.

Figure 12A:
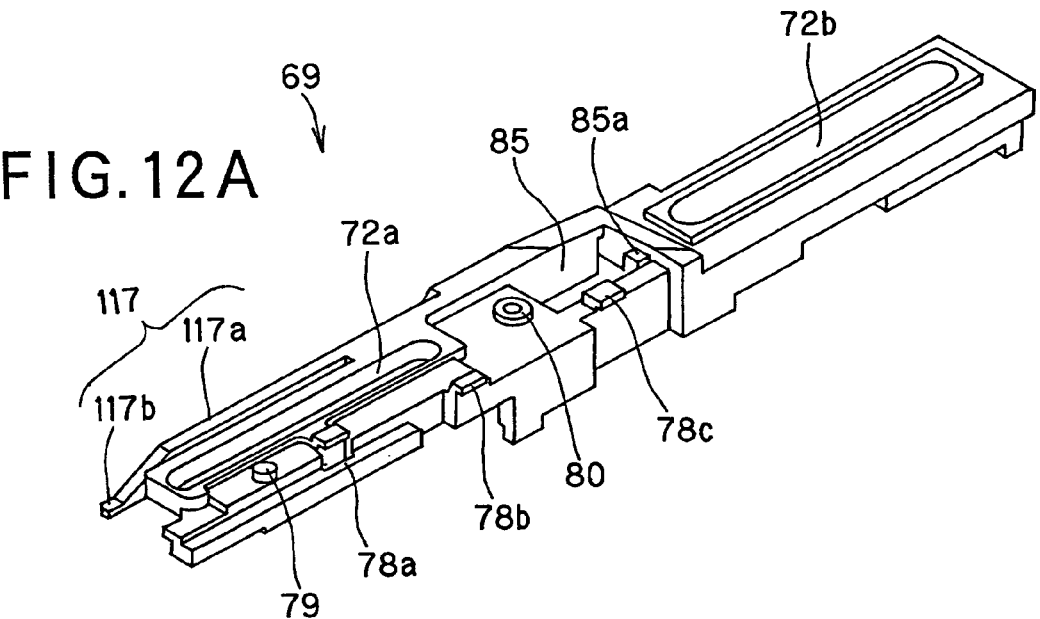
FIG. 12A is a perspective view, from above, of the driving lever
Figure 12B:
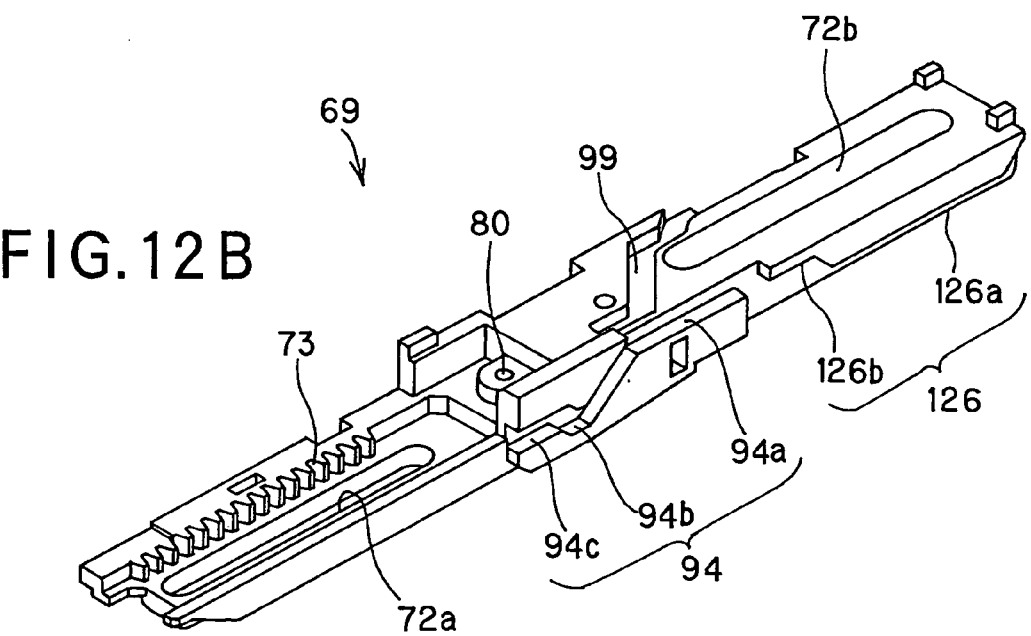
FIG. 12B is a bottom view of the driving lever.
Figure 13A:
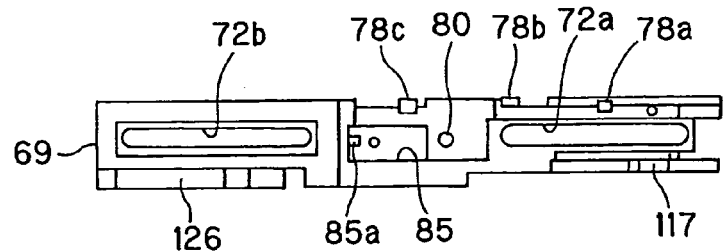
FIG. 13A is a plan view, from below, of the driving lever.
Figure 13B:
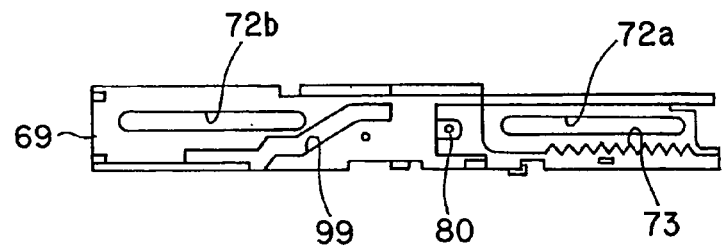
FIG. 13B is a bottom view of the driving lever.
Figure 13C:
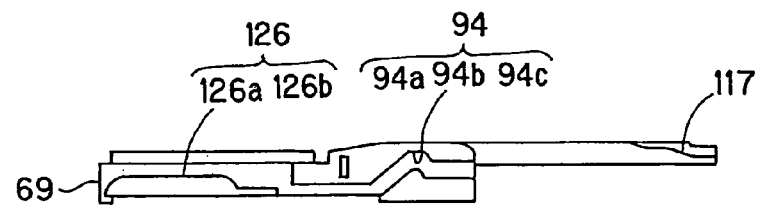
FIG. 13C is a side elevation, view from one side, of the driving lever.
Figure 13D:
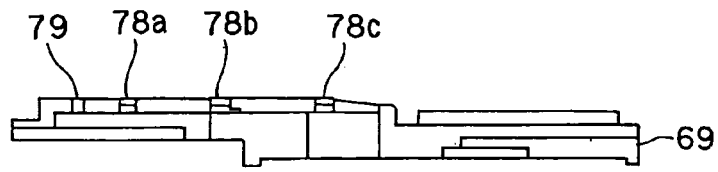
FIG. 13D is a side elevation, view from the other side, of the driving lever.

As shown in FIGS. 6, 12 and 13, the driving lever 69 is a resin-made member having the general shape of a rectangular parallelepiped. It is disposed between one lateral side of the bottom case 4, circuit board 9 and base unit 26 on the bottom of the bottom case 4. Also, the driving lever 69 is located in a position lower than the optical disk 2 introduced into the housing 3 from the disk slot 21, and has an upper surface nearly as high as the bottom of the deck portion 4a.

The driving lever 69 has a pair of guide slits 72a and 72b formed through the thickness thereof and longitudinally thereof. The driving lever 69 is supported slidably back and forth with a spindle of a group of gears 77, which will be described in detail below), being inserted in the front guide slit 72a and the guide shaft 59 provided on the bottom of the bottom case 4 being inserted in the rear guide slit 72b.

The driving lever 69 has formed on the bottom thereof a rack gear 73 extending from the front to the longitudinal middle thereof. On the other hand, the driving lever movement driving mechanism 70 includes a drive motor 75 held on a motor case 74 at the front bottom of the bottom case 4, a worm gear 76 installed to the rotating shaft of the drive motor 75, and the group of gears 77 interposed between the worm gear 76 and the rack gear 73 of the driving lever 69, as shown in FIGS. 3, 5 and 6. The group of gears 77 is pivoted on the spindle on the bottom case 4. In this driving lever movement driving mechanism 70, the drive motor 75 is rotated in one direction (forward) to move the driving lever 69 backward by means of the worm gear 76, gear group 77 and rack gear 75, while the drive motor 73 is rotated in the other direction (rearward) to move the driving lever 69 forward by means of the worm gear 76, gear group 77 and rack gear 73.

Figure 14A:
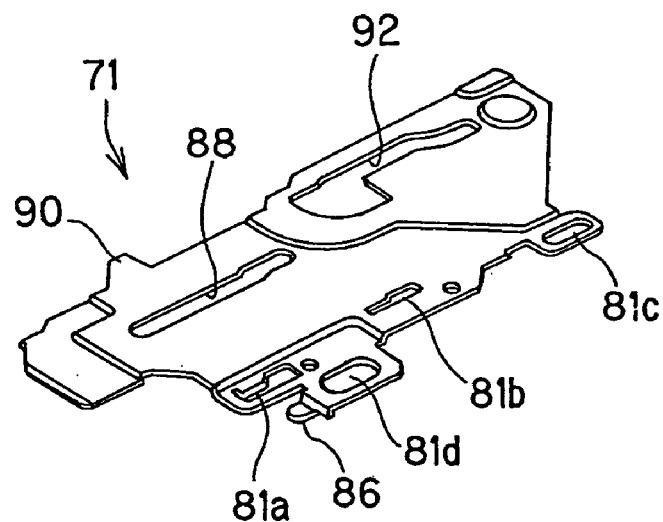
FIG. 14A is a perspective view showing the construction of the moving plate.
Figure 14B:
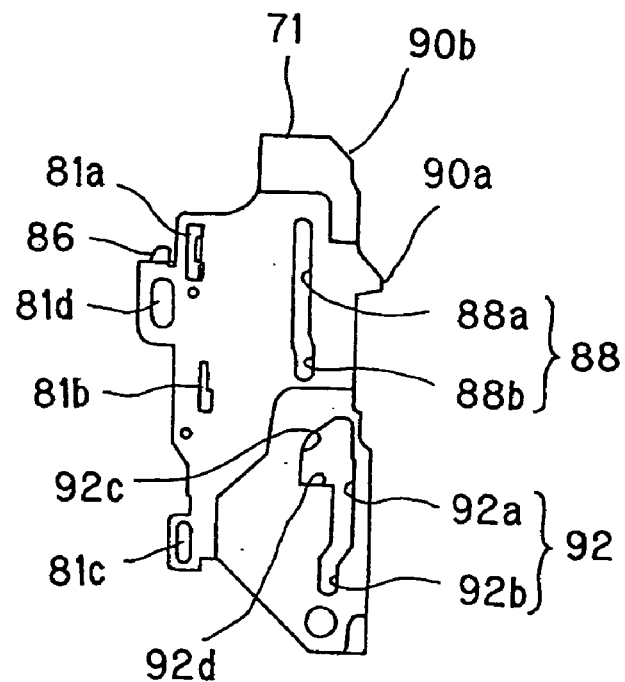
FIG. 14B is a plan view showing the construction of the moving plate.

On the upper side of the driving lever 69, there are provided three guide pieces 78a, 78b and 78c, guide pin 79 and a screw hole 80 as shown in FIGS. 12 and 13. The moving plate 71 is a flat metal sheet punched to have a predetermined shape and disposed on the deck portion 4a, as shown in FIG. 14. The moving plate 71 has formed longitudinally therein three guide slits 81a, 82b and 81c and a guide slit 81d through which a screw 82 is inserted. As shown in FIG. 6, the driving lever 69 and moving plate 71 are slidable in one direction while being engaged on each other in a plane parallel to the optical disk 2 with the two guide pieces 78a and 78b of the driving lever 69 being engaged in the two guide slits 81a and 81b, respectively, in the moving plate 71, one guide piece 81c of the driving lever 69 being engaged on the end of the moving plate 71, the guide pin 79 of the driving plate 69 being engaged in the guide slit 81c in the moving plate 71 and the screw 82 being driven into the screw hole 80 in the driving lever 69 through the guide slit 81d in the moving plate 71.

Also, between the driving lever 69 and moving plate 71, there is provided a shock absorbing mechanism 83 to absorb a difference in placement between the driving lever 69 and moving plate 71, caused by application, to the optical disk 2 ejected to outside the housing 3 from the disk slot 21, of an external force whose direction is opposite to the ejected direction of the optical disk 2 when the driving lever 69 is moved by the driving lever movement driving mechanism 70 in the ejected direction of the optical disk 2.

The shock absorbing mechanism 83 includes a helical compression spring 84 which will absorb a shock applied. The helical compression spring 83 is held in a retention hole 85 formed between the pair of guide slits 72a and 72b of the driving lever 69 as shown in FIGS. 12 and 13. Also, the rear-side end of the helical compression spring 84 is held on a projection 85a extending from the rear-side end of the retention hole 85. On the other hand, the front-side end of the helical compression spring 84 is held on a projection 86 extending from near the guide slit 81d in the moving plate 71 as shown in FIG. 14.

To pivot the first and second pivot arms 41 and 42, the moving plate 71 has formed therein a first cam slit 88 in which a first cam pin 87 provided on the intermediate arm 46 is engaged, a first pressing piece 90a to press, from the rear, a to-be-pressed piece 89 provided on the intermediate arm 46, and a second pressing piece 90b to press, from the front, a to-be-pressed projection 41c provided on the first pivot arm 41, as shown in FIGS. 6 and 14.

The first cam slit 88 includes first and second slit portions 88a and 88b formed linearly in forward and rearward directions. The second slit portion 88b formed linearly rearward from the front end is outwardly offset slightly more than the first slit portion 88a formed linearly forward from the rear end.

The pressing piece 90a is formed to project outward from the edge of the moving plate 71, and can abut the to-be-pressed piece 89 formed by bending the intermediate arm 46 upward at the middle of the latter.

The pressing piece 90b is formed by cutting a part of the rear edge of the moving plate 71. It can abut, from the front, the to-be-pressed projection 41c extending downward from the middle of the first pivot arm 41.

To pivot the third pivot arm 43, the moving plate 71 has formed therein a second cam slit 92 in which the second cam pin 91 provided in the third pivot arm 43. The second cam slit 92 includes first and second slit portions 92a and 92b formed linearly in the forward and rearward directions.

The second slit portion 92b formed linearly rearward from the front end is outwardly offset slightly more than the first slit portion 92a formed linearly forward from the rear end. The second cam slit 92 also includes a third slit portion 92c formed to depict an arc inwardly from the rear end to front middle of the first slit portion 92a and a fourth slit portion 92d formed linearly from the front end of the third slit portion 92c to the middle of the first slit portion 92a. The third slit portion 92c, fourth slit portion 92d and the middle of the first slit portion 92a define together an opening in which the cam pin 91 can freely move.

(1-4) Construction of the Base Lifting Mechanism

The device body 1a includes the base lifting mechanism 93 that vertically moves the base 31 of the base unit 26 in synchronization with the sliding of the aforementioned driving lever 69 as shown in FIGS. 3, 5 and 6.

The base lifting mechanism 93 vertically moves the base 31 among the disk chucking position where it will elevate the base 31 to place the optical disk 2 placed in the disk setting position onto the turn table 27a of the disk mount 27, disk releasing position where it will lower the base 31 to remove the optical disk 2 from the turn table 27a of the disk mount 27, and the intermediate position where it will position the base 31 between the disk chucking and releasing positions to write or read signals to or from the optical disk 2.

To vertically move the base 31, a first cam slit 94 is formed longitudinally in the lateral side of the aforementioned driving lever 69 opposite to the base 31 as shown in FIGS. 12 and 13. The first cam slit 94 is defined by a first horizontal wall 94a for positioning the base 31 in the disk releasing position, a top wall 94b for positioning the base 31 in the disk chucking position, and a second horizontal wall 94c for positioning the base 31 in the intermediate position.

Figure 15A:
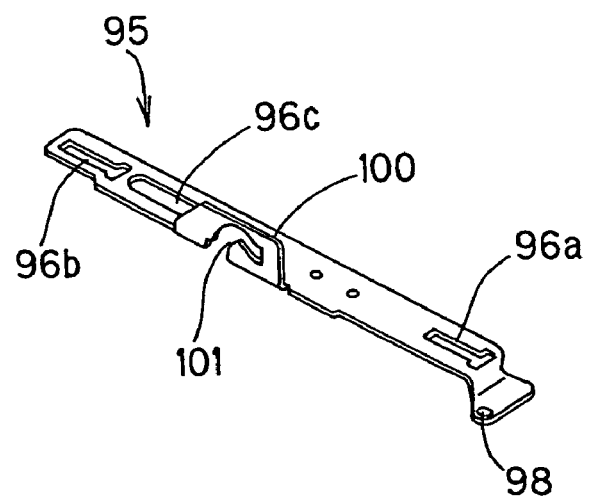
FIG. 15A is a perspective view showing the construction of the cam lever.
Figure 15B:
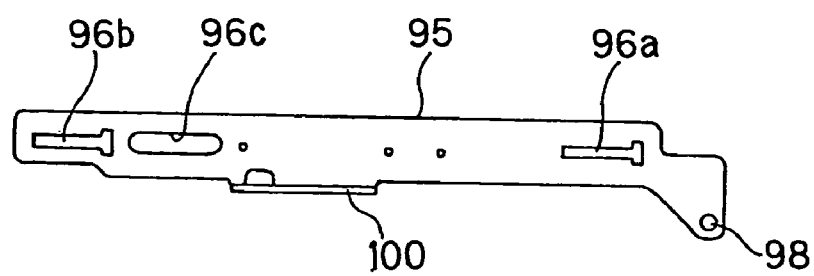
FIG. 15B is a plan view showing the construction of the cam lever.
Figure 15C:
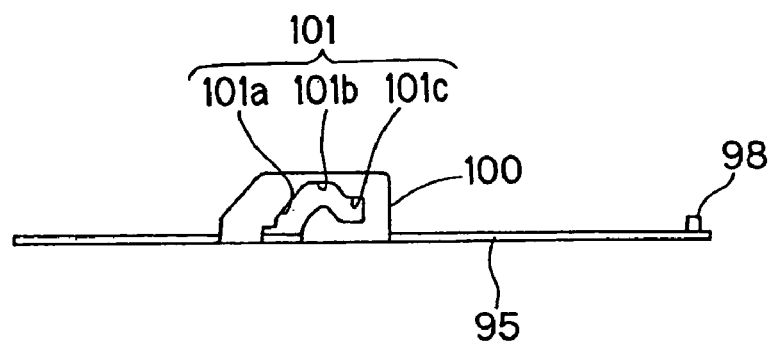
FIG. 15C is a side elevation showing the construction of the cam lever.

Also, on the bottom of the bottom case 4, a cam lever 95 as a third sliding member is disposed along the rear lateral side of the base 31 as shown in FIGS. 6 and 15. The cam lever 95 is a long flat member. It has formed longitudinally on the main side thereof a pair of front and rear guide slits 96a and 96b and a guide slit 96c located between the front and rear guide slits 96a and 96b and in which the guide shaft 65 is inserted. On the other hand, there is formed on the bottom of the bottom case 4 a pair of bent guide pieces 97a and 97b which is engaged in the pair of guide slits 96a and 96b, respectively, as shown in FIG. 5. Thus, the cam lever 95 is supported along the rear lateral side of the base 31 to be slidable in a direction generally perpendicular to the sliding direction of the driving lever 69.

Also, an upward projecting guide pin 98 is formed in a position where the cam lever 95 shown in FIG. 15 intersects the driving lever 69. On the other hand, there is formed on the bottom of the driving lever 69 shown in FIGS. 12 and 13 a guide slit 99 in which the guide pin 98 is engaged. The cam lever 95 is slidable in the direction perpendicular to the sliding direction of the driving lever 69 as the guide pin 98 slides in the guide slit 99 in synchronization with the forward and rearward sliding of the driving lever 69.

The edge portion of the cam lever 95 opposite to the base 31 is bent upward to form a cam piece 100 as shown in FIG. 15. The cam piece 100 is to be used for lifting the base 31. The cam piece 100 has formed therein a second cam slit 101 defined by a first horizontal wall 101a to place the base 31 in the disk releasing position, a top wall 101b to place the base 31 in the disk chucking position, and a second horizontal wall 101c to place the base 31 in the intermediate position. Also, on the bottom of the bottom case 4, there is formed a bent piece 102 extending parallel to the rear lateral side of the base 31 as shown in FIG. 5. The bent piece 102 has formed therein a vertical slit 103 to vertically move the base 31.

Figure 11:
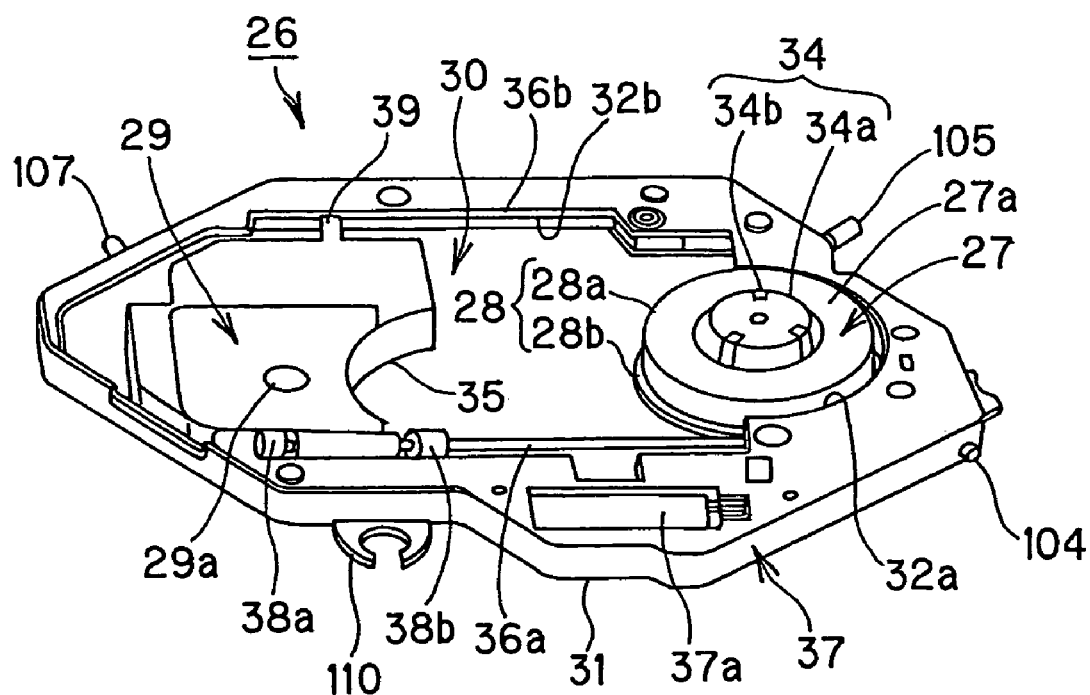
FIG. 11 is a perspective view showing the construction of the base unit.

As shown in FIGS. 5, 6 and 11, the base 31 includes a first spindle 104 located at the lateral side of the disk mount 27, opposite to the driving lever 69, and supported by being engaged in the first cam slit 94 in the driving lever 69, a second spindle 105 located at the lateral side of the disk mount 27, opposite to the cam lever 95 and supported being engaged in the second cam slit 101 in the cam piece 100 and vertical slit 103 in the bent piece 102, a third spindle 107 located at the other front lateral side opposite to the driving lever 69 and supported pivotably in a spindle hole 106 formed in the other lateral side of the bottom case 4, and a stationary portion 110 located at the front side opposite to the lateral side opposite to the cam lever 95 and fixed with a screw 109 to the bottom of the bottom case 4 via an insulator 108 formed from an elastic member such as rubber.

Therefore, in the base 31, the disk mount 27 can be vertically moved in relation to the front as the first spindle 104 slides in the first cam slit 94 in synchronization with the sliding of the driving lever 69 and cam lever 95 and the second spindle 105 slides in the second cam slit 101 and vertical slot 103.

Also, on the bottom of the bottom case 4, there is provided a push-up pin 111 as a releasing means for releasing, from the turn table 27a, the optical disk 2 set on the turn table 27a of the disk mount 27 when the base 31 is lowered by the base lifting mechanism 93 as shown in FIGS. 5 and 6. The push-up pin 111 is located near the disk mount 27 of the base unit 26, more particularly, at the rear of the base 31 nearest to the disk mount 27, to project upward from the bottom of the bottom case 4.

(1-5) Construction of the Disk Guide Mechanism

As shown in FIGS. 3, 5 and 6, the device body 1a includes a disk guide mechanism 112 that guides the optical disk 2 introduced to the front side of the bottom case 4 through the disk slot 21 while limiting the angle at which the optical disk 2 is introduced.

The disk guide mechanism 112 includes a disk insertion guide lever 113 vertically moved in synchronization with the vertical movement of the base 31 by the base lifting mechanism 93. The disk insertion guide lever 113 is a long resin-made member with less friction again the optical disk 2. It is disposed along the direction in which the optical disk 2 is inserted, and has a spindle 114 provided at the base end thereof. It is supported pivotably with the spindle 114 provided at the base end being engaged in a bearing 115 provided at the rear of the motor case 74. Also, the disk insertion guide lever 113 has formed at the free end thereof a guide pin 116 projecting toward the driving lever 69. On the other hand, the driving lever 69 includes a first cam portion 117 which slides on the guide pin 116, as shown in FIGS. 12 and 13. The first cam portion 117 includes a first horizontal portion 117a nearly flush with the upper surface of the driving lever 69 and a second horizontal portion 117b one step lower than the first horizontal portion 117a.

Also, the disk insertion guide lever 113 has fixed to the base end thereof one end of a torsion spring 118 supported on the rear of the motor case 74 as shown in FIGS. 5 and 6. Thus, the rear end of the disk insertion guide lever 113 is forced upward by the elasticity of the torsion spring 118. Reversely, the free end of the disk insertion guide lever 113 is forced downward, so that the guide pin 116 is always pressed to the upper surface of the first cam portion 117.

Therefore, when the driving lever 69 is made to slide in the back-and-forth direction, the guide pin 116 slides on the first cam portion 117 so that the disk insertion guide lever 113 is vertically moved between a guiding position where it will limit the angle at which the optical disk 2 is introduced from the disk slot 21, and a parking position where it will leave the bottom of the optical disk 2 placed on the turn table 27a of the disk mount 27.

(1-6) Construction of the Shutter Operating Mechanism

As shown in FIGS. 3, 5 and 6, the device body 1a has provided at the front of the bottom case 4a shutter operating mechanism 119 that prevents, while one optical disk 2 is set on the turn table 27a of the disk mount 27, another optical disk 2 from being introduced into the housing 3 through the disk slot 21.

The above shutter operating mechanism 119 includes a shutter member 120 vertically moved in synchronization with the disk insertion guide lever 113 being vertically moved by the disk guide mechanism 112. The shutter member 120 is a generally rectangular flat member. It is engaged in a vertical slit 121 formed at the front of the bottom case 4 and thus supported at the rear side thereof to be vertically slidable. Also, the rear side of the shutter member 120 is supported by one end of a pivot arm 122 supported pivotably on the lateral side of the motor case 74. On the other hand, the other end of the torsion spring 118 is fixed to the other end of the pivot arm 122. The other end of the pivot arm 122 is forced upward by the elasticity of the torsion spring 118. Reversely, the one end of the pivot arm 122 is forced downward and the shutter member 120 is held in a lower position.

In the shutter operating mechanism 119, when the disk insertion guide lever 113 is vertically moved in synchronization with a back-and-forth sliding of the aforementioned driving lever 69, the torsion spring 118 supported on the motor case 74 is rotated about its axis and the forcing direction of the torsion spring 118 is reversed. That is, the other end of the pivot arm 122 is forced downward by the elasticity of the torsion spring 118, while the one end of the pivot arm 122 will be forced upward. Thus, the shutter member 120 is held in an upper position.

Therefore, when the driving lever 69 is made to slide in the back-and-forth direction, the shutter member 120 is vertically moved between a close position in which it will close the path of the optical disk 2 introduced from the disk slot 21 in synchronization with the disk insertion guide lever 113 being vertically moved by the disk guide mechanism 112, and an open position where it will open the path of the optical disk 2 introduced from the disk slot 21.

On the aforementioned second pivot arm 42 and base 31, there are formed protective films 123 that prevent the contact with the signal recording layer of the optical disk 2 as shown in FIG. 3. Each of the protective films 123 is formed from a material less frictional against the optical disk 2. A plurality of protective films 123 are provided in positions corresponding to the periphery of the optical disk 2 in the disk setting position. Also, on the front side of the base 31, there is attached a protective sheet 124 that prevents contact with the signal recording layer of the optical disk 2 introduced from the disk slot 21.

Also, of the plurality of detection switches SW1, SW2 and SW3 disposed on the aforementioned circuit board 9, the first detection switch SW1 detects whether there exists any optical disk 2 introduced from the disk slot 21 and provides an instruction to start driving of the driving lever 69. It is located near the second coupling arm 53, as shown in FIG. 6. On the other hand, at the middle of the second coupling arm 53, there is formed a pressing piece 125 bent from the rear and which presses the sensor of the first detection switch SW1.

When the first and second pivot arms 41 and 42 are pivoted rearward as the optical disk 2 is introduced, the sensor of the first detection switch SW1 is pressed by the pressing piece 125 of the second coupling arm 53 and thus the first detection switch SW1 is turned on. While the first and second pivot arms 41 and 42 are located more rearward than the position where the sensor is pressed, that is, while the optical disk 2 is still in the housing 3, the sensor will be pressed by the pressing piece 125 and thus the first detection switch SW1 will be kept on.

The second and third detection switches SW2 and SW3 are provided to detect the position of the driving lever 69 and controls the driving of the driving lever 69. They are located side by side on the edge of the circuit board 9 opposite to the driving lever 69 with a predetermined spacing between them.

When the driving lever 69 slides rearward and the lateral side of the driving lever 69 presses the sensor with the second detection switch SW2 being located more rearward than the third detection switch SW3, the second detection switch SW2 is turned on. While the driving lever 69 is located more rearward than the position where the sensor is pressed, the sensor of the second detection switch SW2 will be pressed by the lateral side of the driving lever 69 and thus the second detection switch SW2 will be kept on.

On the other hand, the third detection switch SW3 will be turned on when it is located more rearward than the second detection switch SW2 and its sensor is pushed up by a second cam portion 126 provided at the lateral side of the driving lever 69. As will be seen in FIGS. 12 and 13, the second cam portion 126 of the driving lever 69 includes a first horizontal portion 126a to push up the sensor of the third detection switch SW3 and turn on the third detection switch SW3, and a second horizontal portion 126b located more forward, and in a position one step lower, than the first horizontal portion 126a to turn off the third detection switch SW3. It should be noted that the third detection switch SW3 has the sensor thereof initially pushed up by the first horizontal portion 126a and thus turned on.

(2) Operation of the Disk Drive

The disk drive 1 constructed as having been described above operates as will be described below.

(2-1) Initial Operation

Figure 29:
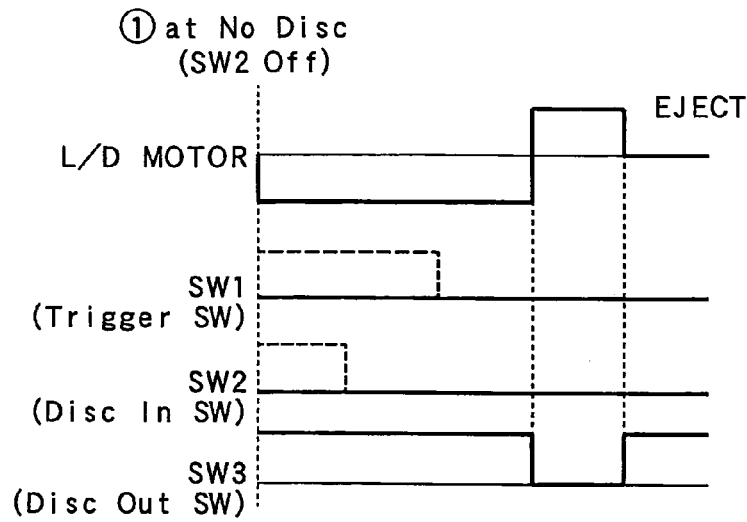
FIG. 29 is a timing diagram showing the setting of the first, second and third switches for the initial operation of the disk drive.

The disk drive 1 makes an initial operation before any optical disk 2 is introduced as will be described below with reference to the timing diagram shown in FIG. 29.

Figure 16:
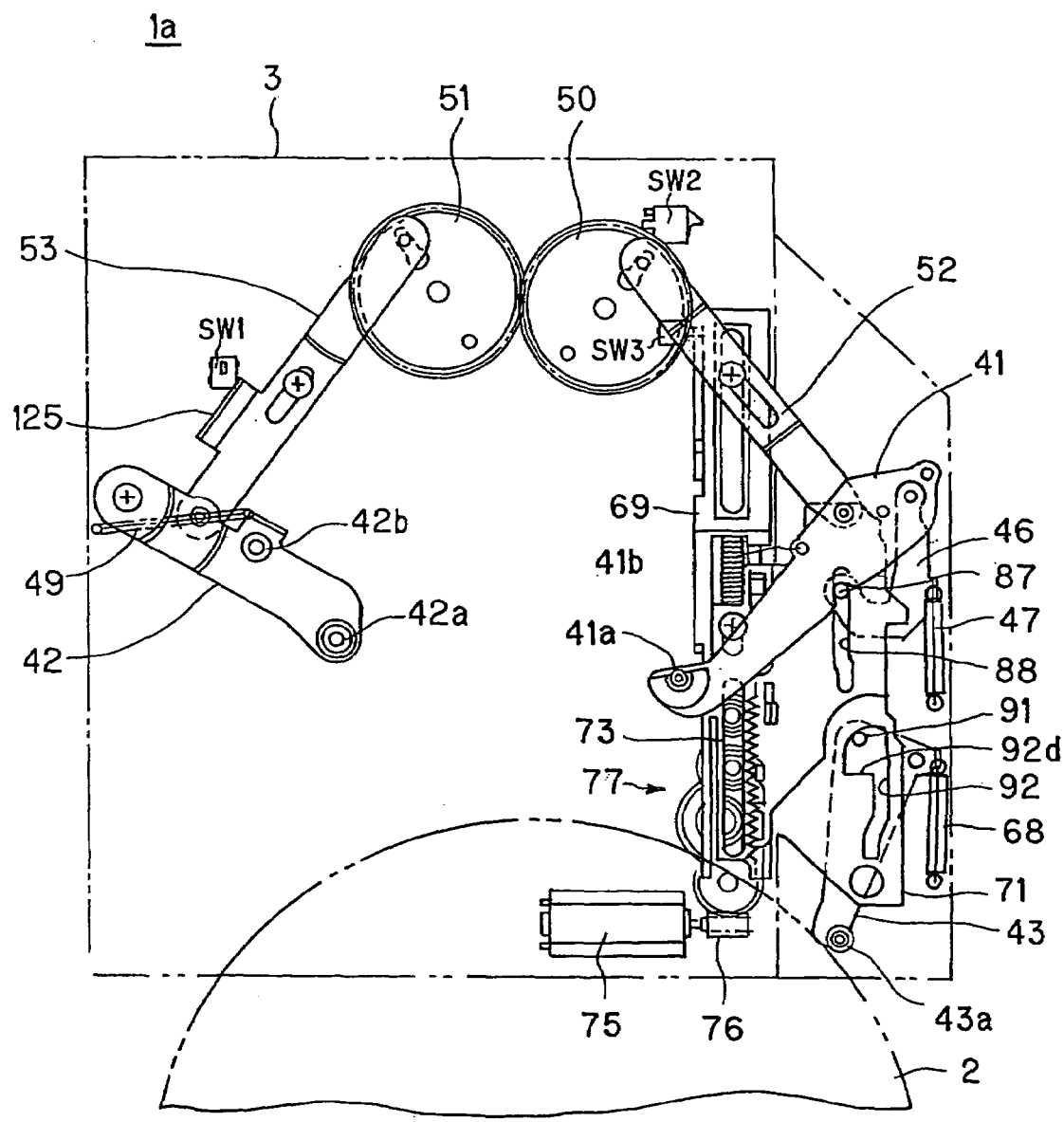
FIG. 16 is a plan view explaining the operation of the disk insertion/ejection mechanism, showing a disk having been inserted into a disk insertion/ejection position.

More specifically, first, when the personal computer 1000 is switched on, the device body 1*a* starts being supplied with a power from the computer body 1001 via the external connector 12 and it is detected that the third detection switch SW3 is on, the driving lever movement driving mechanism 70 will have the driving lever 69 slide to the front end while having the drive motor 75 run backward, as will be seen from FIG. 16. At this time, as the sensor of the third detection switch SW3 sliding on the first horizontal portion 126*a* of the second cam portion 126 goes down along the rear slope of the first horizontal portion 126*a*, the third detection switch SW3 will be changed in state from on to off.

Next, when it is detected that the third detection switch SW3 is off, the driving lever movement driving mechanism 70 will have the driving lever 69 slide rearward while having the drive motor 75 run forward. Then, when the third detection switch SW3 is changed in state from off to on again, the driving lever movement driving mechanism 70 will stop the drive motor 75 from running.

Figure 32:
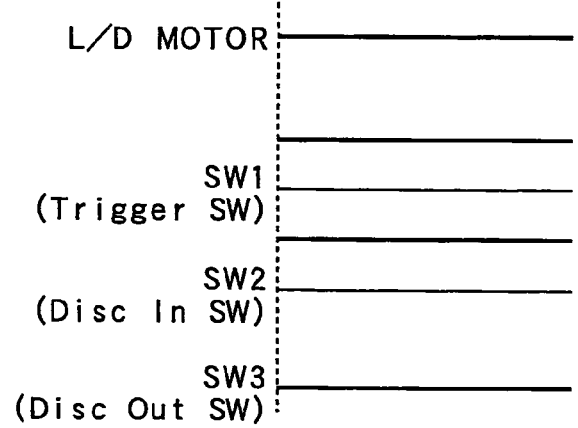
FIG. 32 is a timing diagram showing the setting of the first, second and third switches for the write/read operation in the disk drive.

Also, when the power supply to the device body 1*a* is started, it is detected that the first and second detection switches SW1 and SW2 are on and also that the third detection switch SW3 is on, the disk drive 1 will determine that an optical disk 2 is set on the disk mount 27 and be ready for a write/read operation which will be described in detail later without starting the driving by the drive motor 75, as shown in FIG. 32.

The disk drive 1 completes the initial operation as above.

(2-2) Disk Loading

Figure 30:
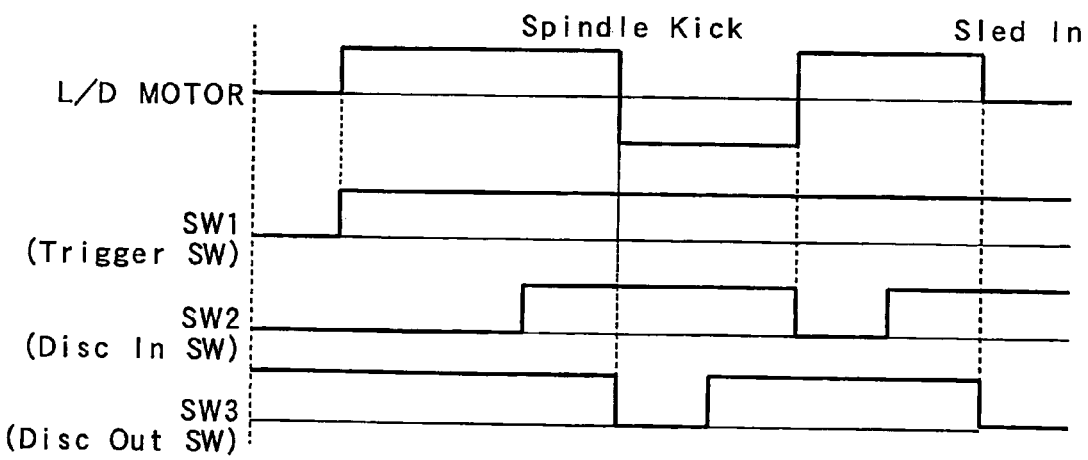
FIG. 30 is a timing diagram showing the setting of the first, second and third switches for the disk loading in the disk drive.

When an optical disk 2 is introduced from the disk slot 21 of the housing 3, the disk drive 1 will make a disk loading operation to bring the optical disk 2 having been inserted in the housing 3 from the disk slot 21 to the disk setting position, as will be seen from the timing diagram shown in FIG. 30.

More particularly, first, when the optical disk 2 is introduced into the housing 3 through the disk slot 21 in the state shown in FIG. 16, it will be guided deeper in the housing 3 while it is being limited by the pair of guide projections 8*a* and 8*b* from being directed vertically and its periphery is being limited by the pair of guide members 24*a* and 24*b* from being directed vertically and horizontally.

Figure 22A:
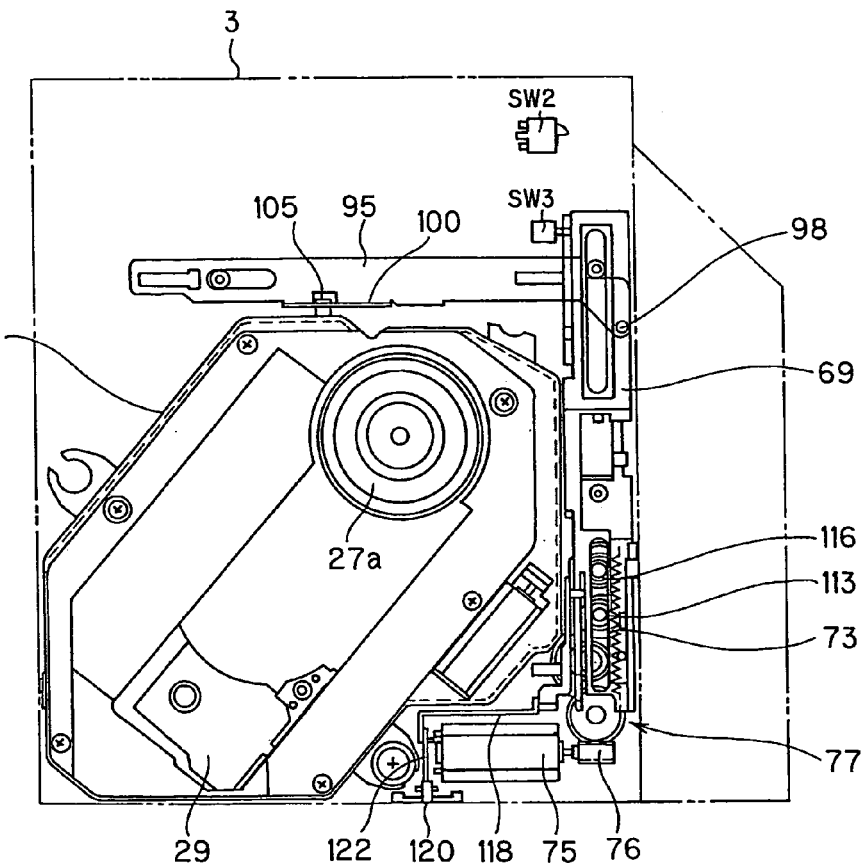
FIG. 22A is a plan view showing the base unit in the disk releasing position.
Figure 22B:
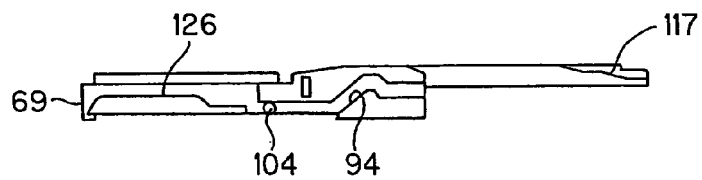
FIG. 22B is a side elevation showing a geometrical relation between the first spindle of the base in the disk releasing position and the first cam slit in the driving lever.
Figure 22C:
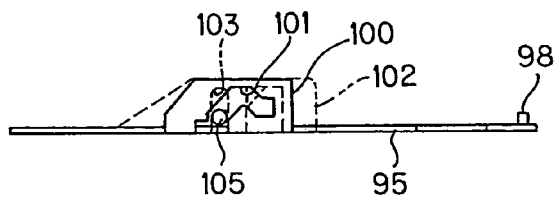
FIG. 22C is a side elevation showing a geometrical relation between the second spindle of the base in the disk releasing position and the second cam slit in the cam piece and vertical slit in the bent piece.
Figure 23:
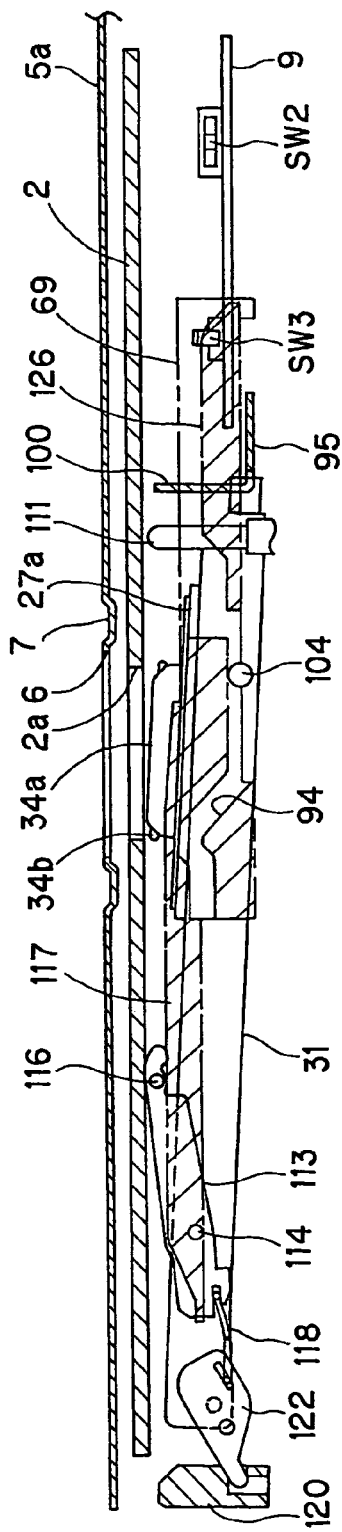
FIG. 23 is a sectional view explaining the operation of the base lifting mechanism, guide lifting mechanism and shutter operating mechanism, showing the base unit in the disk releasing position.

Also, in the disk guide mechanism 112, the guide pin 116 of the disk insertion guide lever 113 is positioned on the horizontal portion 117*a* of the first cam portion 117, so that the disk insertion guide lever 113 will limit the angle at which the optical disk 2 is inserted from the disk slot 21, as shown in FIGS. 22 and 23. Thus, when the optical disk 2 is introduced into the housing 3 through the disk slot 21, it is possible to prevent the signal recording layer of the optical disk 2 from being in touch with any of the components on the base 31, whereby the signal recording layer can be protected from being scratched or damaged.

Then, the optical disk 2, having been introduced from the disk slot 21, will abut the first abutment pin 41*a* of the first pivot arm 41 and second abutment pin 42*a* of the second pivot arm 42.

Figure 17:
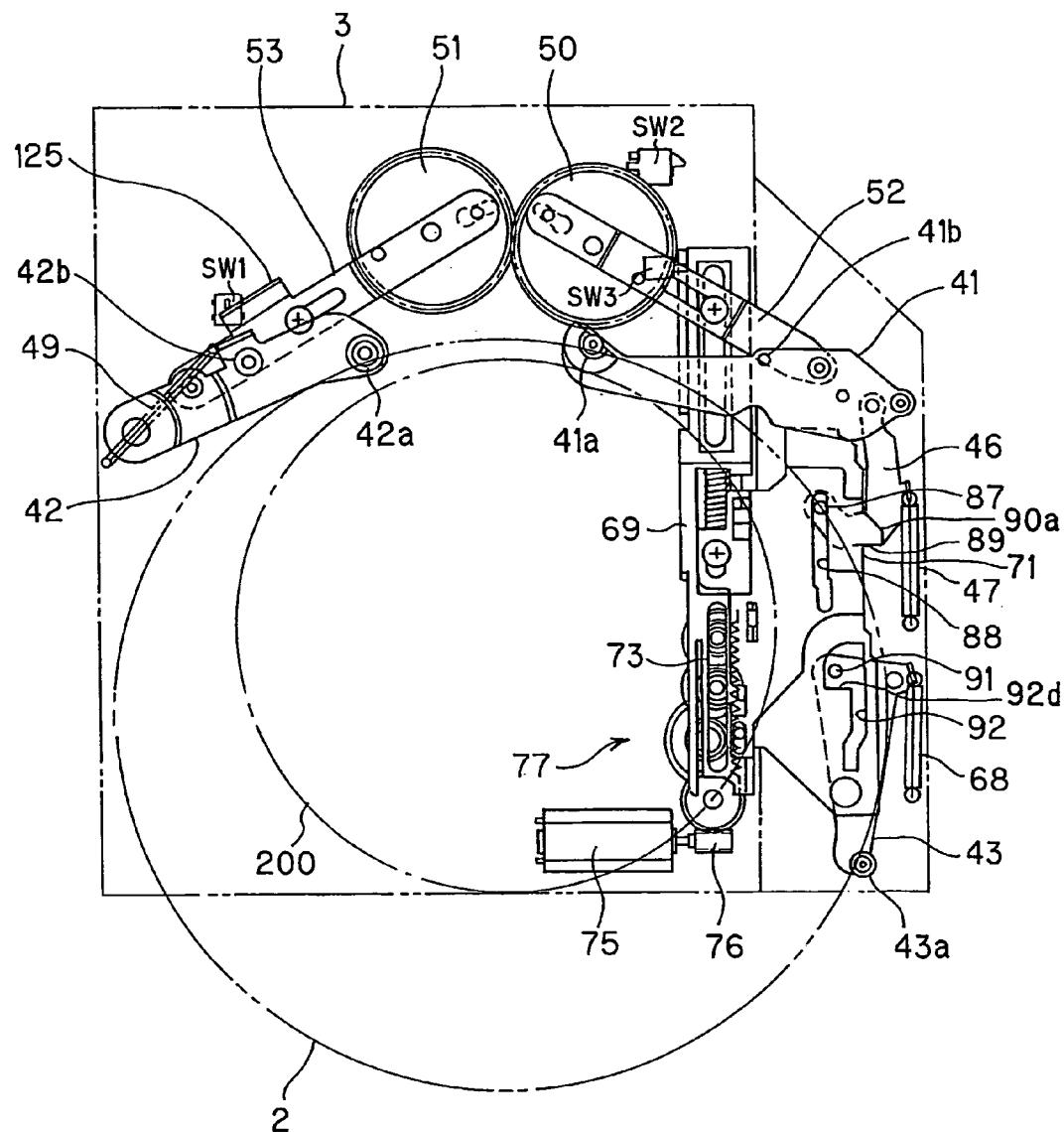
FIG. 17 is also a plan view explaining the operation of the disk insertion/ejection mechanism, showing the disk being transported.

Next, as the optical disk 2 is further forced deeper in the housing 3 from the disk slot 21, the first and second pivot arms 41 and 42 will be pivoted rearward in opposition to each other against the force of the first and second helical tension springs 47 and 49 while the periphery of the optical disk 2 is forced the first and second abutment pins 41*a* and 42*a*, as shown in FIG. 17. Then, when the first and second pivot arms 41 and 42 are pivoted a predetermined extent rearward, the pressing piece 125 of the second coupling arm 53 will press the sensor of the first detection switch SW1. Thus, the first detection switch SW1 will be turned on based on the detection signal from the first detection switch SW1, and the driving lever movement driving mechanism 70 will have the drive motor 75 run forward to start the rearward sliding of the driving lever 69.

On the other hand, as the optical disk 2 is inserted into the housing 3 from the disk slot 21, the third abutment pin 43*a* of the third pivot arm 43 will abut the rear periphery of the optical disk 2 as shown in FIG. 16. Then, as the optical disk 2 is forced deeper in the housing 3 from the disk slot 21 from the above position, it will have the third pivot arm 43 pivot outward against the force of the third helical tension spring 68 while pressing the third abutment pin 43*a*. At this time, the third abutment pin 43*a* will move round along the periphery of the optical disk 2. Then, the third abutment pin 43*a* will in turn abut the front periphery of the optical disk, and thus the third pivot arm 43 is pivoted rearward under the action of the third helical tension spring 68.

Also, as the moving plate 71 is made to slide rearward in synchronization with the rearward sliding of the driving lever 69, the second cam pin 91 sliding in the second cam slit 92 will be pressed by the fourth slit portion 92*d* and thus the third pivot arm 43 will be pivoted rearward.

Thus, pivoted to the rear of the third pivot arm 43 having the third abutment pin 43*a* put in contact with the front periphery while being kept at the rear periphery in contact with the first and second abutment pins 41*a* and 42*a* of the first and second pivot arms 41 and 42, respectively, forced by the first and second helical tension springs 47 and 49, respectively, the optical disk 2 will be brought deeper in the housing 3.

Also, as the second pivot arm 42 is pivoted from the front to rear, the second helical tension spring 49 changes the direction in which the second pivot arm 42 is forced from a direction in which the spring 49 is pivoted forward to a direction in which the spring 49 is pivoted rearward, to thereby bring the optical disk 2 into the housing 3 more easily.

Figure 18:
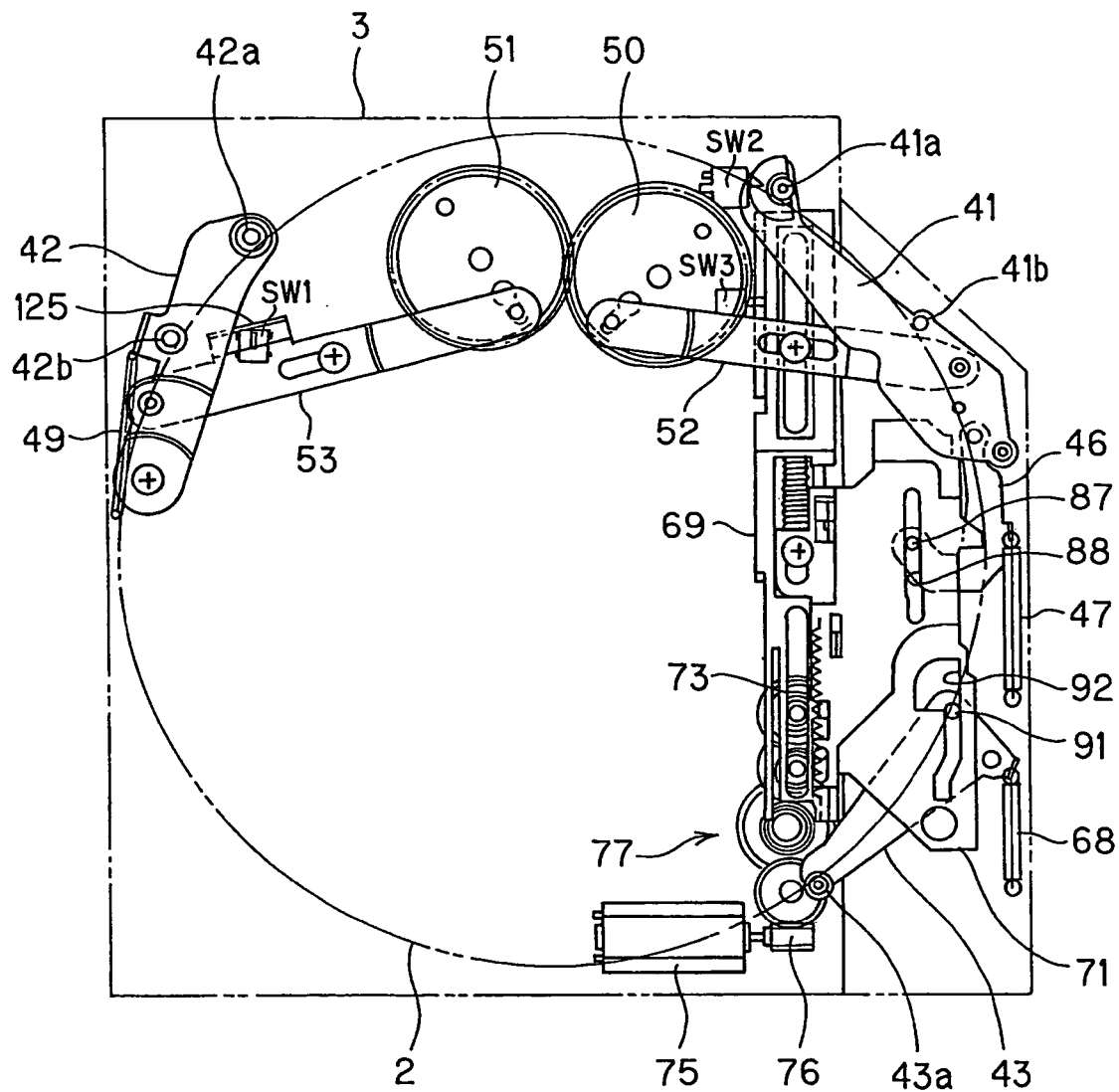
FIG. 18 is a plan view explaining the operation of the disk insertion/ejection mechanism, showing the disk having been brought to a disk setting position.

As having been described above, the first to third pivot arms 41 to 43 cooperate with each other to bring the optical disk 2 to the disk setting position shown in FIG. 18 and into the housing 3.

(2-3) Disk Centering

Next in the disk drive 1, the optical disk 2 is set in the disk setting position (disk centering operation) by forcing the periphery of the optical disk 2, having been brought to the disk setting position, toward the second abutment pin 41*a* and first positioning pin 41*b* of the first pivot arm 41 and second abutment pin 42*a* and second positioning pin 42*b* of the second pivot arm 42, positioned correspondingly to the disk setting position, with the third abutment pin 43*a* of the third pivot arm 43 being kept in contact with the front periphery of the optical disk 2, as shown in FIG. 18.

(2-4) Disk Chucking

Figure 24A:
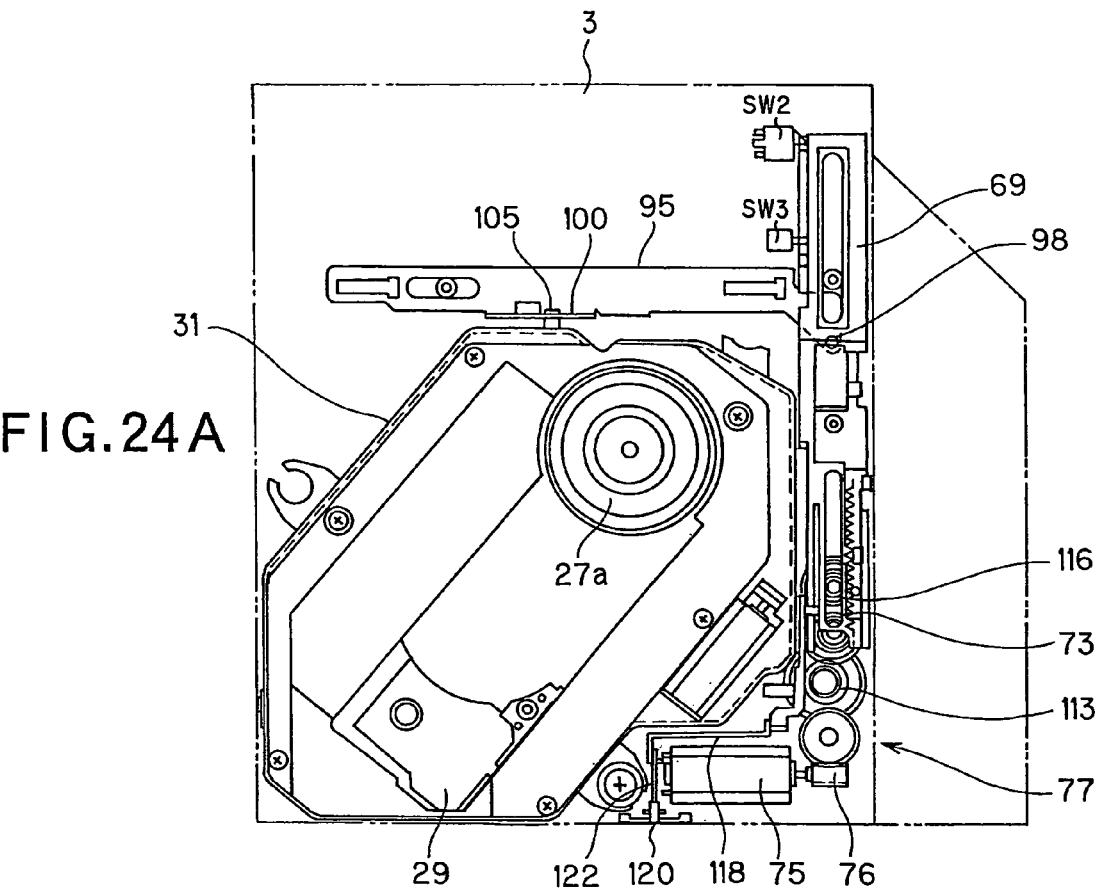
FIG. 24A is a plan view showing the base unit being in the disk chucking position.
Figure 24B:
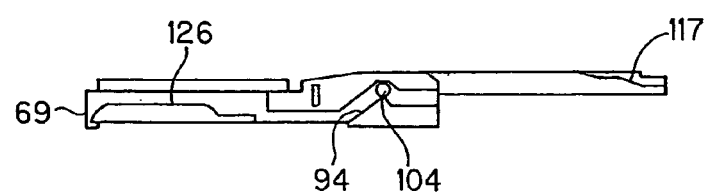
FIG. 24B is a side elevation showing a geometrical relation between the first spindle of the base in the disk chucking position and the first cam slit in the driving lever.
Figure 24C:
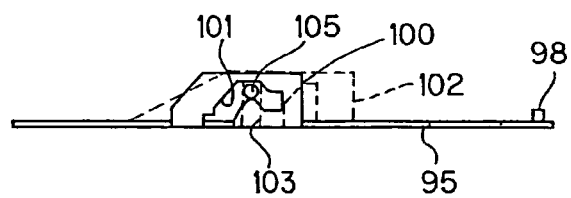
FIG. 24C is a side elevation showing a geometrical relation between the second spindle of the base in the disk chucking position and the second cam slit in the cam piece and vertical slit in the bent piece.
Figure 25:
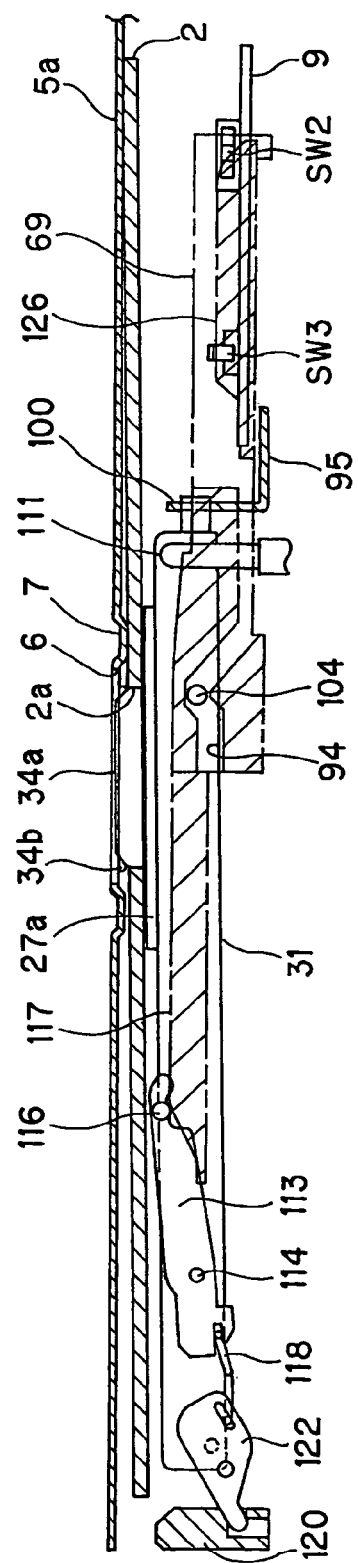
FIG. 25 is a sectional view explaining the operation of the base lifting mechanism, guide lifting mechanism and shutter operating mechanism, showing the base unit in the disk chucking position.

Then in the disk drive 1, the base lifting mechanism 93 elevates the base 31 to place the optical disk 2, having been set in the disk setting position, onto the turn table 27*a* of the disk mount 27 (disk chucking operation) as shown in FIGS. 24 and 25.

More specifically, when the cam lever 95 is made to slide leftward in synchronization with the rearward sliding of the driving lever 69, the first spindle 104 of the base 31 will slide in the first cam slit 94 in the driving lever 69, and the second spindle 105 of the base 31 will slide in the second cam slit 101 in the cam piece 100 and vertical slit 103 in the bent piece 102. Then, the first spindle 104 will slide in the first cam slit 94 from the first horizontal wall 94*a* to the top wall 94*b* and the second spindle 105 will slide in the second cam slit 101 from the first horizontal wall 101*a* to the top wall 101*b*, to thereby elevate the base 31 to the chucking position.

At this time, the wall of the central hole 2*a* in the optical disk 2 set in the disk setting position is forced to the abutment projection 7 of the top plate 5*a* while the engagement protrusion 34*a* is entering the central hole 2*a* in the optical disk 2, so that the engagement protrusion 34*a* is engaged in the central hole 2*a* in the optical disk 2 and the plurality of engagement claws 34*b* rest around the central hole 2*a* in the optical disk 2, whereby the optical disk 2 will be retained on the turn table 27*a*. Thus, the optical disk 2 is placed on the disk mount 27 (first disk chucking operation).

Figure 19:
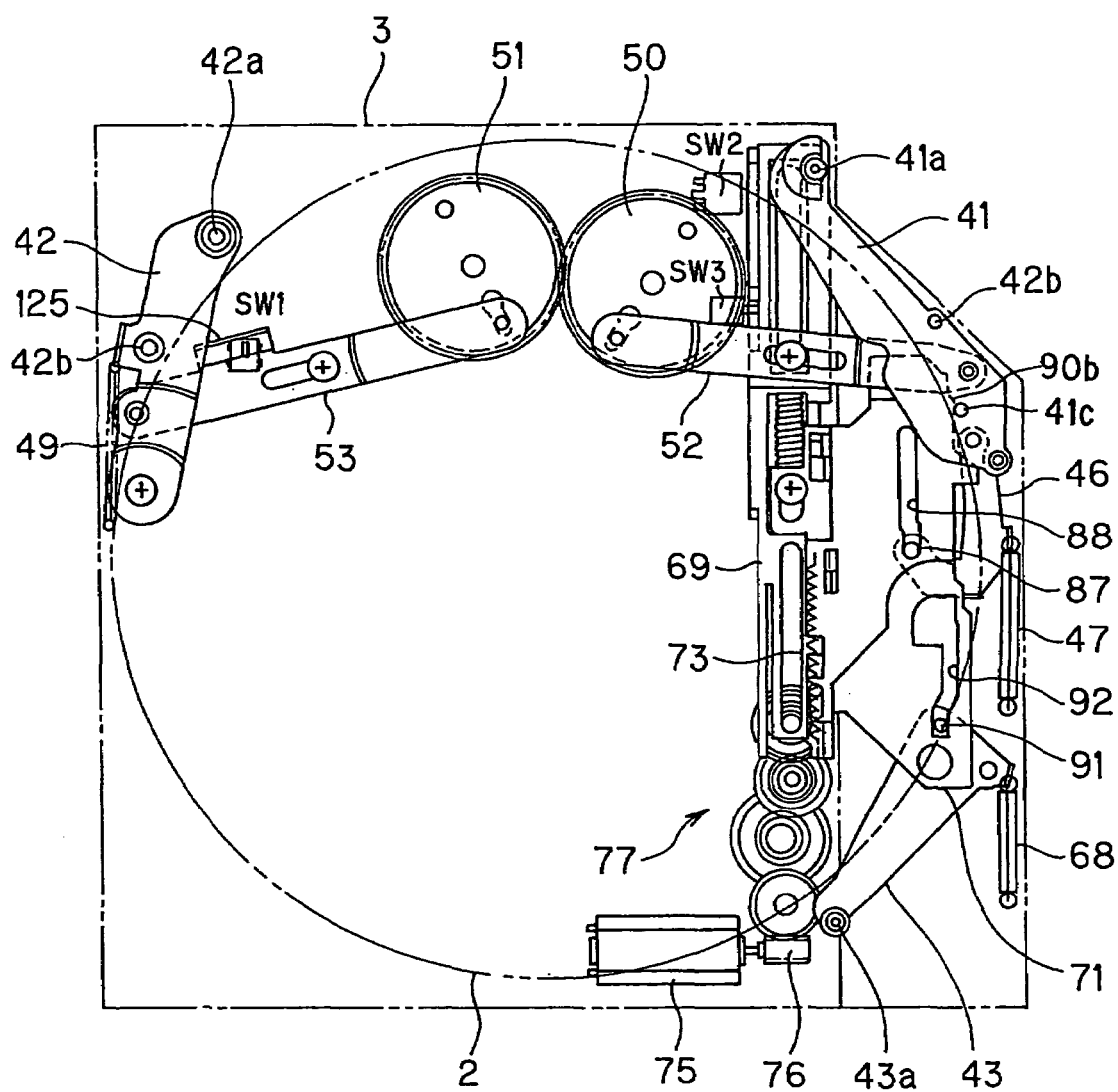
FIG. 19 is a plan view explaining the operation of the disk insertion/ejection mechanism, showing the disk being exactly in the disk setting position.

Next in the disk drive 1, the moving plate 71 will be made to slide to the rear end in synchronization with the rearward sliding of the driving lever 69 as shown in FIG. 19.

At this time, the pressing piece 90*b* of the moving plate 71 presses the to-be-pressed projection 41*c* of the first pivot arm 41 from the front. Thus, the first and second pivot arms 41 and 42 pivot to a position where the first positioning pin 41*b* of the first abutment pin 41*a* and the second abutment pin 42*a* and second positioning pin 42*b* leave the periphery of the optical disk 2 in the disk setting position in the rearward direction. Also, the first cam pin 87 of the intermediate arm 46 slides in the first cam slit 88 in the moving plate 71, so that the first cam pin 87 will shift from the first slit portion 88*a* to the second slit portion 88*b*.

On the other hand, the second cam pin 91 of the third pivot arm 43 slides in the second cam slit 92 in the moving plate 71, so that the second cam pin 91 will shift from the first slit portion 92*a* to the second slit portion 92*b*. Thus, the third pivot arm 43 pivots to a position where the third abutment pin 43*a* leaves the periphery of the optical disk 2 in the disk setting position in the forward direction. Thus, the first abutment pin 41*a* and first positioning pin 41*b* of the first pivot arm 41, second abutment pin 42*a* and second positioning pin 42*b* of the second pivot arm 42 and the third abutment pin 43*a* of the third pivot arm 43 leave the periphery of the optical disk 2 set on the disk mount 27.

Figure 26A:
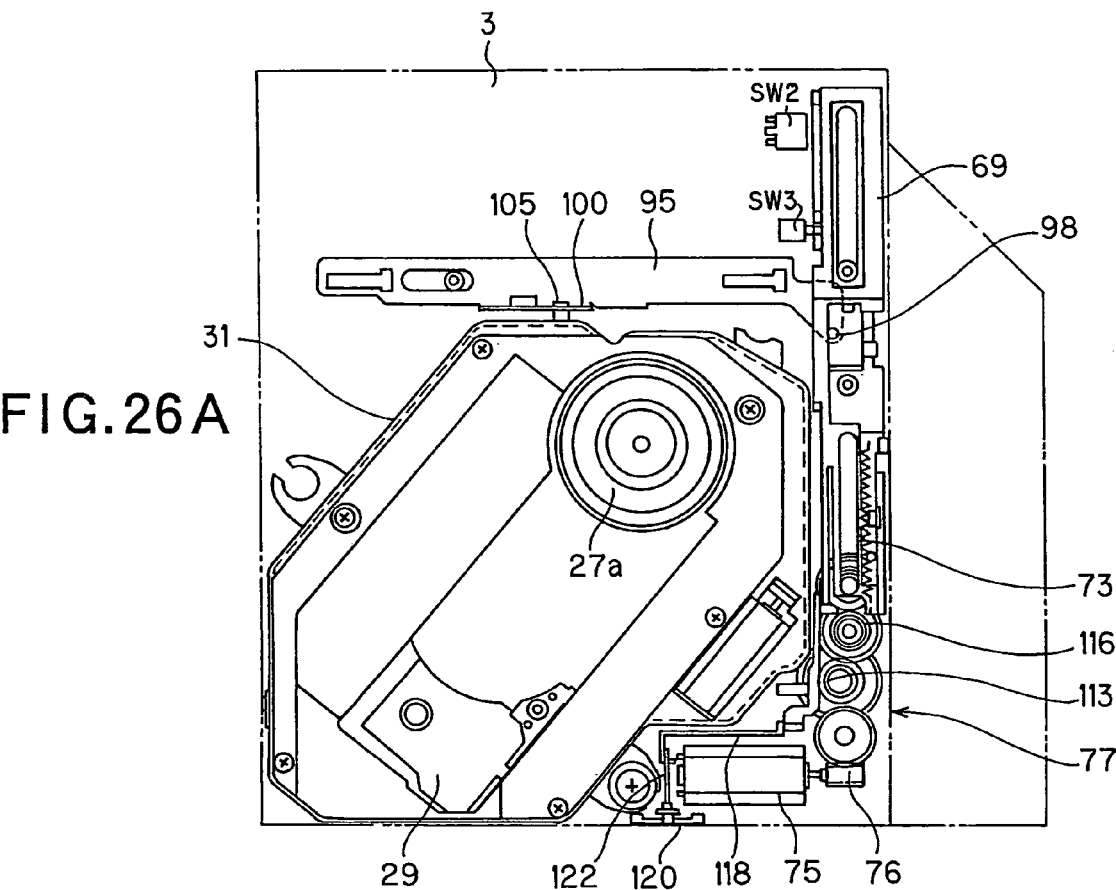
FIG. 26A is a plan view showing the base unit being in the write/read position.
Figure 26B:
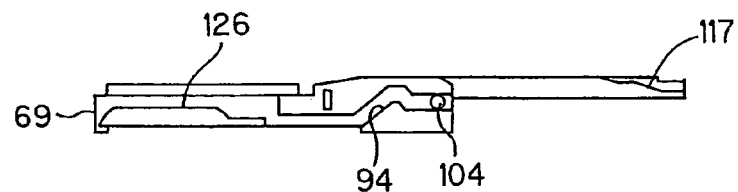
FIG. 26B is a side elevation showing a geometrical relation between the first spindle of the base in the write/read position and the first cam slit in the driving lever.
Figure 26C:
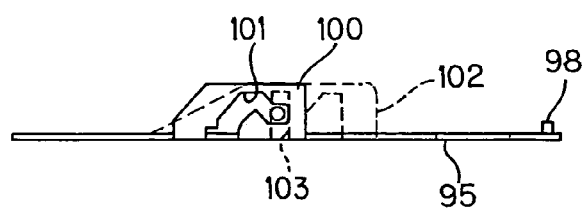
FIG. 26C is a side elevation showing a geometrical relation between the second spindle of the base in the write/read position and the second cam slit in the cam piece and vertical slit in the bent piece.
Figure 27:
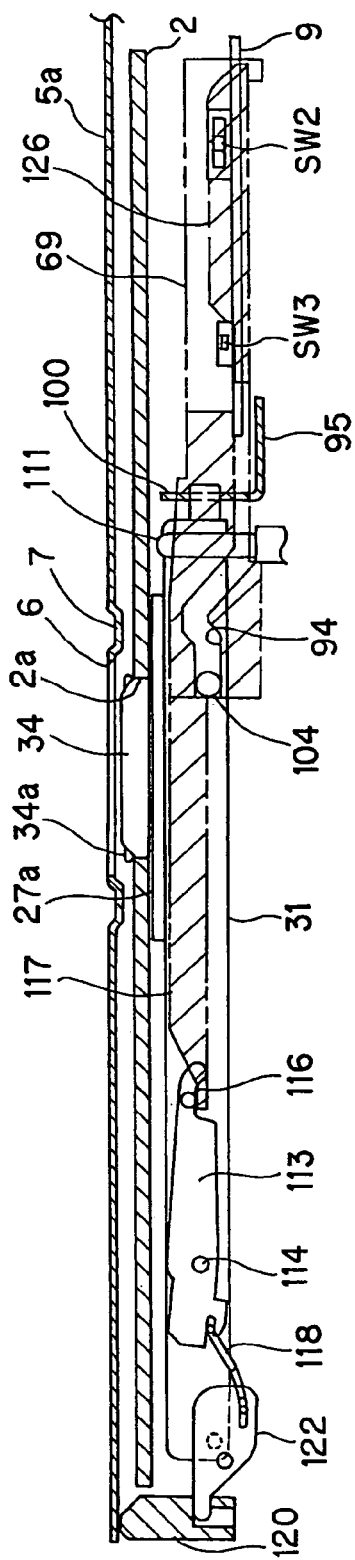
FIG. 27 is a sectional view explaining the operation of the base lifting mechanism, guide lifting mechanism and shutter operating mechanism, showing the base unit in the write/read position.

Also in the disk drive 1, when the driving lever 69 is made to slide to the rear end, the cam lever 95 will slide to the left end in synchronization with the sliding of the driving lever 69 as shown in FIGS. 26 and 27. At this time, the first spindle 104 slides in the first cam slit 94 from the top wall 94*b* to the second horizontal wall 94*c*, while the second spindle 105 slides in the second cam slit 101 from the top wall 101*b* to the second horizontal wall 101*c*, whereby the base 31 is lowered to the intermediate position.

Then, the second detection switch SW2 has the sensor thereof pressed by the lateral side of the driving lever 69 and thus will be turned on as shown in FIG. 30. Also, the sensor of the third detection switch SW3 slides on the second horizontal portion 126*b* of the second cam portion 126 and thus will be changed in state from on to off.

At this time, the spindle motor 28*a* of the disk rotation driving mechanism 28 spins the optical disk 2 to shift the latter to another phase. Also, the driving lever movement driving mechanism 70 has the drive motor 75 run reversely to make the driving lever 69 slide forward.

Then, when the cam lever 95 slides rightward in synchronization with the forward sliding of the driving lever 69, the first spindle 104 slides in the first cam slit 94 from the second horizontal wall 94*c* to the top wall 94*b* and the second spindle 105 slides in the second cam slit 101 from the second horizontal wall 101*c* to the top wall 101*b*. Thus, the base 31 is elevated to the disk chucking position again to place the optical disk 2 onto the disk mount 27 with the optical disk 2 being shifted to another phase (second disk chucking operation).

In the disk drive 1, the driving lever 69 slides forward after completion of the above-mentioned disk chucking operation, so that the third detection switch SW3, being off, is turned on while the second detection switch SW2, being on, is turned off, as shown in FIG. 30.

At this time, the driving lever movement driving mechanism 70 has the drive motor 75 run forward to slide the driving lever 69 rearward. In this disk drive 1, when the moving plate 71 is made to slide to the rear end in synchronization with the rearward sliding of the driving lever 69, the first and second pivot arms 41 and 42 are pivoted to a position where the first abutment pin 41*a* and first positioning pin 41*b*, and the second abutment pin 42*a* and second positioning pin 42*b*, leave the periphery of the optical disk 2 set in the disk mount 27 in the rearward direction, and the third pivot arm 43 is pivoted to a position where the third abutment pin 43*a* leaves the periphery of the optical disk 2 in the forward direction, as shown in FIG. 19.

Also in the disk drive 1, the driving lever 69 is made to slide to the rear end, so that the cam lever 95 is made to slide to the left end and the base 31 is lowered to the intermediate position again, as shown in FIGS. 26 and 27.

Then, when the second detection switch SW2, being off, is turned on and the third detection switch SW3, being on, is turned on again, the driving lever movement driving mechanism 70 stops the drive motor 75 from running, as shown in FIG. 30.

Also, when the driving lever 69 is at the rear end, the guide pin 116 of the disk insertion guide lever 113 is positioned on the second horizontal portion 117*b* of the first cam portion 117, so that the disk guide mechanism 112 lowers the disk insertion guide lever 113 to a position where the latter will leave the optical disk 2 placed on the turn table 27*a* of the disk mount 27, as shown in FIGS. 26 and 27. Thus, when the optical disk 2 set on the turn table 27*a* is rotated, it is possible to prevent any contact between the disk insertion guide lever 113 and the signal recording layer of the optical disk 2.

Also, the shutter operating mechanism 119 operates in synchronization with the lowering of the disk insertion guide lever 113 to elevate the shutter member 120 to a position where it will close the path of the optical disk 2 introduced from the disk slot 21. Thus, the when the optical disk 2 is already set on the turn table 27*a*, it is possible to prevent another optical disk 2 from being introduced into the housing 3 through the disk slot 21.

The disk loading operation of the disk drive 1 is completed as above.

(2-5) Write/Read Operation

In the disk drive 1, an information signal is written to or read from the optical disk 2 set on the disk mount 27 in the condition shown in FIGS. 19, 26 and 27. More specifically, when the spindle motor 28*a* drives the optical disk 2 along with the turn table 27*a*, the optical pickup 29 is moved by the pickup feeding mechanism 30 from the outer to inner circumference and thus focus servo control and tracking servo control are applied, and TOC data is read from the lead-in area on the optical disk 2. Then, for writing the information signal to the optical disk 2, the optical pickup 29 is moved to a predetermined address in the program area on the optical disk 2 on the basis of the read TOC data. Also, for reading information signal from the optical disk 2, the optical pickup 29 is moved to an address in the program area where designated data is recorded. Then, the optical pickup 29 writes or reads the information signal to a desired recording track on the optical disk 2.

Note that during write/read operation, the first detection switch SW1 is on, the second detection switch SW2 is off and the third detection switch SW3 is off as shown in FIG. 32.

Data write/read is done by the disk drive 1 as above.

(2-6) Disk Ejection

Figure 31:
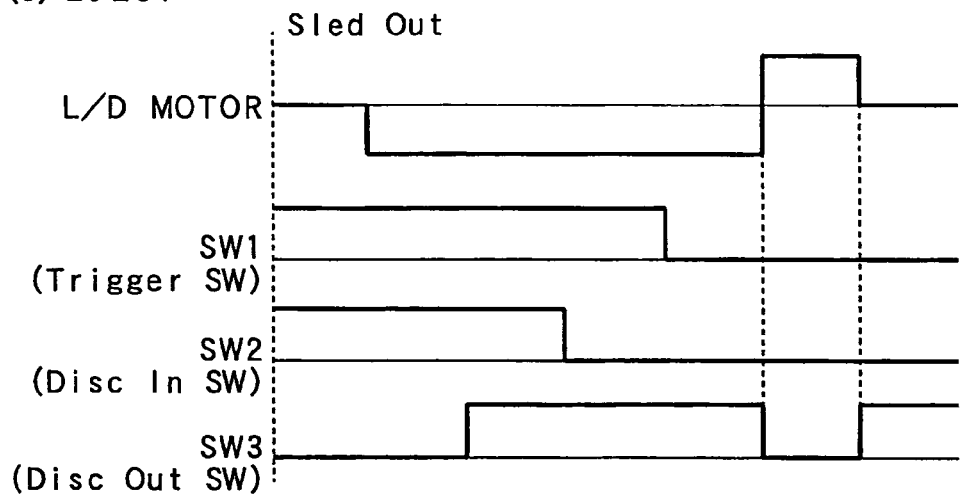
FIG. 31 is a timing diagram showing the setting of the first, second and third switches for the disk ejection in the disk drive.

In the disk drive 1, the optical disk 2 set on the disk mount 27 is brought to outside the housing 3 through the disk slot 21 (disk ejecting operation) according to the time diagram shown in FIG. 31.

More specifically, first when the eject button 23 on the front panel 20 is pressed or when an eject command is sent to the disk drive 1 from the aforementioned personal computer 1000, the driving lever movement driving mechanism 70 operates, based on the eject command, to have the driving lever 69 slide forward while having the drive motor 75 run reversely.

Then, when the cam lever 95 is made to slide rightward in synchronization with the forward sliding of the driving lever 69, the first spindle 104 slides in the first cam slit 94 from the second horizontal wall 94c to the first horizontal wall 94a via the top wall 94b while the second spindle 105 slides in the second cam slit 101 from the second horizontal wall 111c to the first horizontal wall 101a via the top wall 101b. Thus, the base 31 is lowered to the disk releasing position as shown in FIGS. 22 and 23.

(2-7) Disk Releasing

Figure 28:
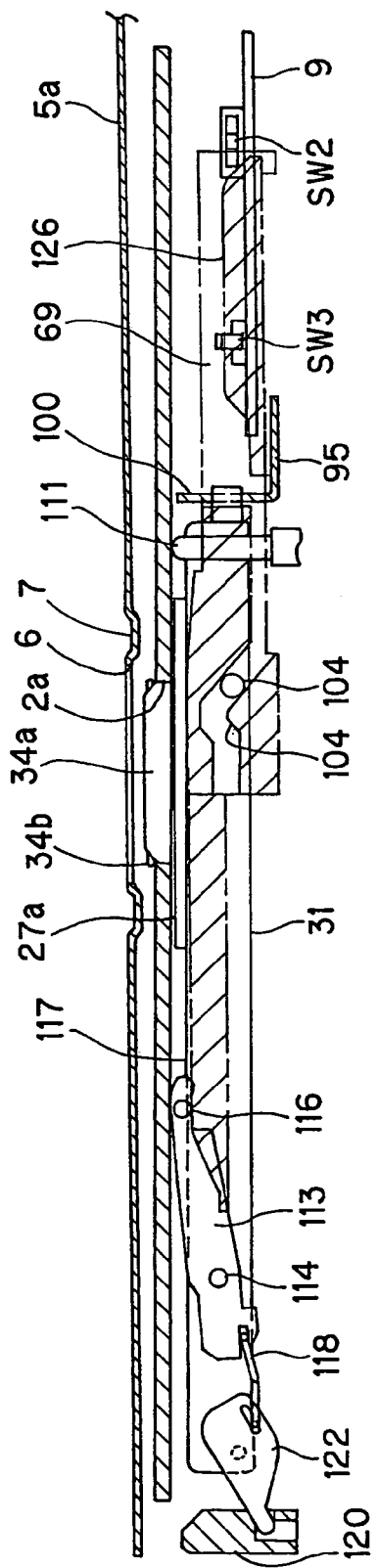
FIG. 28 is a sectional view explaining the operation of the base lifting mechanism, guide lifting mechanism and shutter operating mechanism, showing the disk being in contact with the push-up pin.

Next in the disk drive 1, the base 31 is lowered to the disk releasing position, so that the optical disk 2 is released from the turn table 27a of the disk mount 27 (disk releasing operation). More particularly, when the base 31 is lowered to the disk releasing position, the free end of the push-up pin 111 will abut the non-signal recording area at the inner-circumferential side of the optical disk 2 set on the turn table 27a of the disk mount 27 to release the optical disk 2 from on the turn table 27a while pushing up the optical disk 2, as shown in FIG. 28.

Also, in the disk guide mechanism 112, as the driving lever 69 slides forward, the guide pin 116 of the disk insertion guide lever 113 will be positioned on the first horizontal portion 117a of the first cam portion 117, as shown in FIGS. 22 and 23. Thus, the disk insertion guide lever 113 is elevated to a position where it will limit the angle at which the optical disk 2 is introduced from the disk slot 21.

Also the shutter operating mechanism 119 lowers, in synchronization with the forward sliding of the disk insertion guide lever 113, the shutter member 120 to a position where it will close the path of the optical disk 2 introduced from the disk slot 21.

Next in the disk drive 1, the moving plate 71 is made to slide forward in the sequence shown in FIGS. 18, 17 and 16 in synchronization with the forward sliding of the driving lever 69. At this time, the pressing piece 90a of the moving plate 71 presses the to-be-pressed piece 89 of the intermediate arm 46 from the rear. Thus, with the first and second abutment pins 41a and 42a being made to abut, from the rear, the periphery of the optical disk 2 in the disk setting position, the first and second pivot arms 41 and 42 are pivoted forward in opposite directions, respectively.

Also, the first helical tension spring 47 forces the first pivot arm 41 in a direction which the latter will be pivoted forward, and as the second pivot arm 42 is pivoted from the rear toward the front, the second helical tension spring 49 changes the direction in which the second pivot arm 42 is forced to a direction in which the second pivot arm 42 will be pivoted forward. Thus, the optical disk 2 is ejected more easily to outside the housing 3.

Figure 20:
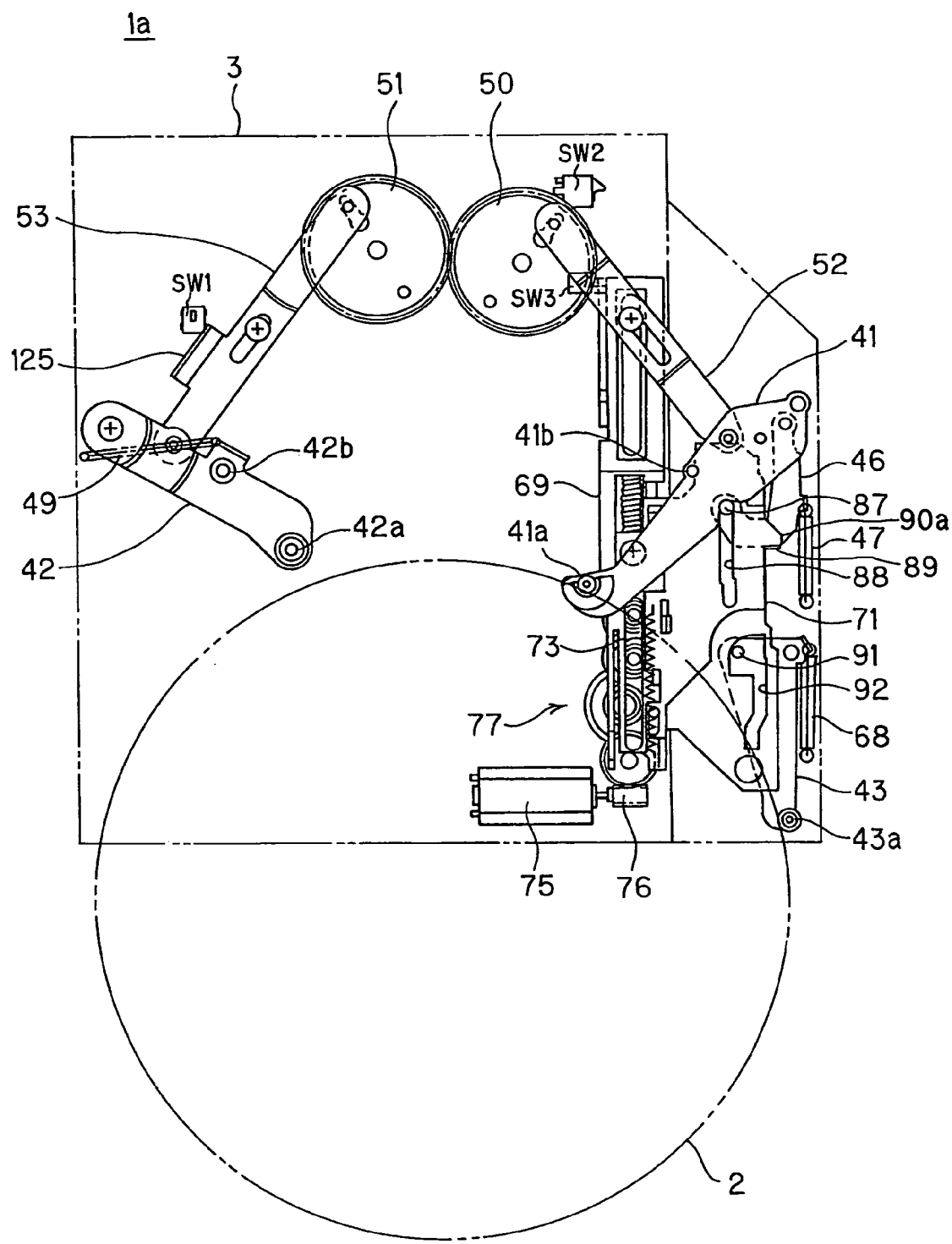
FIG. 20 is a plan view explaining the operation of the disk insertion/ejection mechanism, showing the disk having been ejected to the disk insertion/ejection position.

On the other hand, as the moving plate 71 is made to slide to the front end, the second cam pin 91 is made to slide in the second cam slit 92 in the moving plate 71 along the third sliding portion 92c and the third pivot arm 43 is pivoted forward, as shown in FIG. 20.

As mentioned above, the first to third pivot arms 41 to 43 move in cooperation with each other to bring the optical disk 2 to the disk insertion/ejection position shown in FIG. 20 and eject it to outside the housing 3 through the disk slot 21.

Then, as the second detection switch SW2 is applied with no pressure from the periphery of the driving lever 69, it will be turned off, and as the first detection switch SW1 is not applied with pressure from the pressing piece 125 of the second coupling arm 53, it will be turned off, as shown in FIG. 31. Also, the sensor of the third detection switch SW3 sliding on the first horizontal portion 126a of the second cam portion 126 is lowered along the rear slope of the first horizontal portion 126a, so that the third detection switch SW3 is changed in state from on to off.

At this time, the driving lever 69 slides to the front end, so that the pressing piece 90a of the moving plate 71 will press the to-be-pressed piece 89 of the intermediate arm 46 from the rear, as shown in FIG. 20. Thus, the first pivot arm 41 will be pivoted to the forefront to positively bring the optical disk 2 from the disk slot 21 to a position where the central hole 2a will be exposed to outside the housing 3.

Also, after it is detected that the third detection switch SW3 is off, the driving lever movement driving mechanism 70 has the driving lever 69 slide rearward while having the drive motor 75 run forward, as shown in FIG. 16. Then, when the third detection switch SW3 being off is turned on again, the driving lever movement driving mechanism 70 will stop the drive motor 75 from running.

In the disk drive 1, the optical disk 2 is ejected as above.

As having been described above, since the first to third pivot arms 41 to 43 move in cooperation to load and eject the optical disk 2 stably and appropriately, the disk drive 1 can be designed more compact, lightweight and thinner as a slot-in type disk drive.

Also, in the disk drive 1, even if an optical disk 2 which is smaller in diameter (8 cm, for example) than the normal-size one (12 cm, for example) is inserted into the housing 3 through the disk slot 21, the first and second pivot arms 41 and 42 will not be pivoted rearward to a position where the sensor of the first detection switch SW1 is pressed by the pressing piece 125 of the second pivot arm 53. Therefore, in the disk drive 1, the first and second pivot arms 41 and 42 disposed in such a generally inverted-V geometry that they are positioned symmetrically with respect to the disk mount 27 will possibly bring the optical disk 2 of such a small diameter forcibly to outside the housing 3 through the disk slot 21 before the first detection switch SW1 is turned on, namely, before the driving lever 69 starts being driven by the drive motor 75.

Also in the disk drive 1, the optical disk 2 can be centered stably and appropriately by optimizing the arrangement and pivoting direction of the pivot arms 41 to 43. Namely, in centering the optical disk 2, the periphery of the optical disk 2, having been brought to the disk setting position, will evenly be forced toward the first abutment pin 41a and first positioning pin 41b of the first pivot arm 41 and the second abutment pin 42*a* and second positioning pin 42*b* of the second pivot arm 42, positioned correspondingly to the disk setting position, with the third abutment pin 43*a* of the third pivot arm 43, being pivoted rearward, being put in contact with the rear periphery of the optical disk 2, as shown in FIG. 18.

Therefore, in the disk drive 1, the position and pressing direction of the pin abutting the periphery of each disk as an oscillating body are not nonuniform as in the disk drive disclosed in the patent document No. 2, and thus no additional disk positioning member and disk guide have to be provided to solve this problem. Also, such a stable disk centering will allow to make a subsequent disk chucking appropriately.

Also in this disk drive 1, since the second disk chucking operation is made with the optical disk 2 having been shifted to another phase after completion of the first disk chucking operation, so the optical disk 2 can positively be set on the disk mount 27.

Further in this disk drive 1, the structure of the top cover 5 to the bottom case 4, which improves the rigidity of the housing 3, improves the reliability on the operations of elevating the base 31 and setting the optical disk 2 onto the turn table 27*a* of the disk mount 27.

Note that the disk drive 1 is so constructed that there can be established a coincidence between the intermediate position where the spindle motor 28*a* of the aforementioned disk rotation driving mechanism 28 spins the optical disk 2 to shift the latter to another phase and the write/read position where signals are written to or read from the optical disk 2. However, these positions may not necessarily be coincident with each other. Namely, in the disk drive 1, since the disk rotation driving mechanism 28 can spin the optical disk 2 and shift the latter to another phase when the base 31 is lowered after completion of the disk chucking operation, and thus the periphery of the central hole 2*a* of the disk 2 leaves the abutment projection 7 of the top plate 5*a*, so the intermediate and write/read positions may be different from each other.

Also in the disk drive 1, since the base lifting mechanism 93 vertically moves the disk mount 27 of the base 31 forward, so it is possible to stably make a more positive disk chucking operation by swapping the position of the turn table 27*a* for the first disk chucking operation and that for the second disk chucking operation between them by shifting the phase of optical disk 2 by about 180 deg.

Note that although the disk chucking operations is done twice in this embodiment, the number of times of disk chucking can freely be selected. Also, in case the aforementioned optical pickup 29 is moved from the outer to inner circumference after repetition of the disk chucking operation and thus no focus servo control and tracking servo control can be applied, the optical disk 2 is forcibly ejected by the disk ejecting operation, which effectively stabilizes the operation of the disk drive 1.

Also in the disk drive 1, the optical pickup 29 is held at the outer circumferential side in the radial direction until the optical disk 2 is completely chucked. Thus, it is possible to eliminate the possibility of collision between the optical pickup 29 and signal recording layer of the optical disk 2.

Also in this disk drive 1, the disk insertion guide lever 113 is vertically moved between the position in which it will limit the angle at which the optical disk 2 is introduced from the disk slot 21 and the parking position in which it will leave the bottom of the optical disk 2 set on the turn table 27*a* of the disk mount 27, in synchronization with the vertical movement of the base 31. So, the entire device can be designed thinner by narrowing the vertical-moving range of the base 31, even in case the disk insertion guide member for limiting the angle at which the optical disk 2 is introduced is provided on the bottom of the bottom case 4.

Also in the disk drive 1, there is provided the shutter member 120 which is vertically moved in synchronization with the vertical move of the disk insertion guide lever 113. So, any optical disk 2 to be loaded can be prevented from being erroneously introduced into the housing 3 through the disk slot 21 without having to design the entire device larger.

Figure 21:
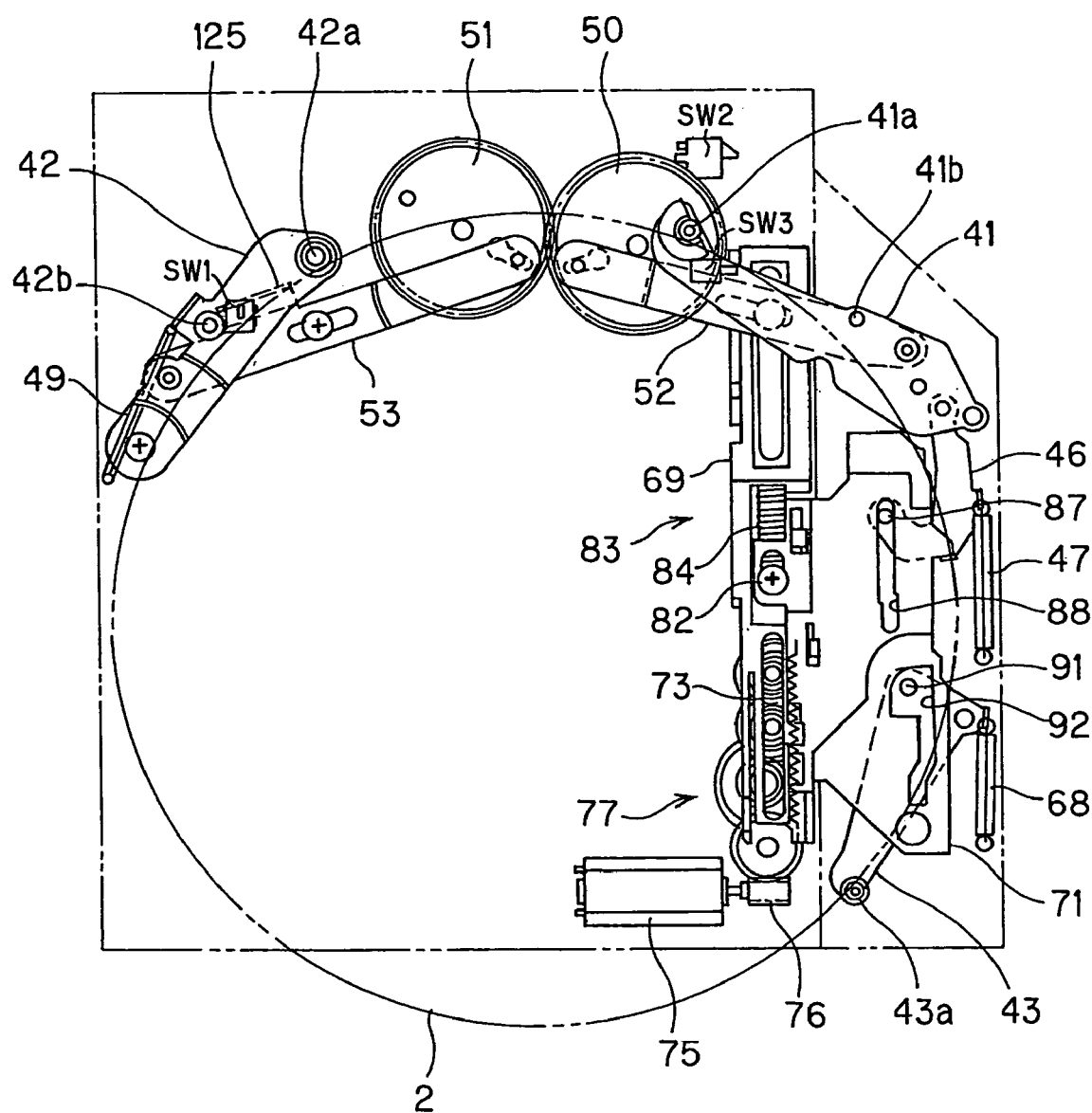
FIG. 21 is a plan view explaining the operation of the disk insertion/ejection mechanism, showing the disk to be ejected having been forced into the device housing.

Also in the disk drive 1, there is provided the helical compression spring 84 which can absorb a difference in movement between the driving lever 69 and moving plate 71, caused by an external force applied to the optical disk 2 ejected to outside the housing 3 through the disk slot 21 in a direction opposite to the ejecting direction of the optical disk 2 when the driving lever 69 is moved by the driving lever movement driving mechanism 70 in the direction in which the optical disk 2 is ejected, as shown in FIG. 21 for example.

Thus, it is possible to prevent the possibility that the internal mechanisms and optical disk 2 are damaged with an external force applied in a direction opposite to the ejecting operation during ejection of the optical disk 2.

Figure 33:
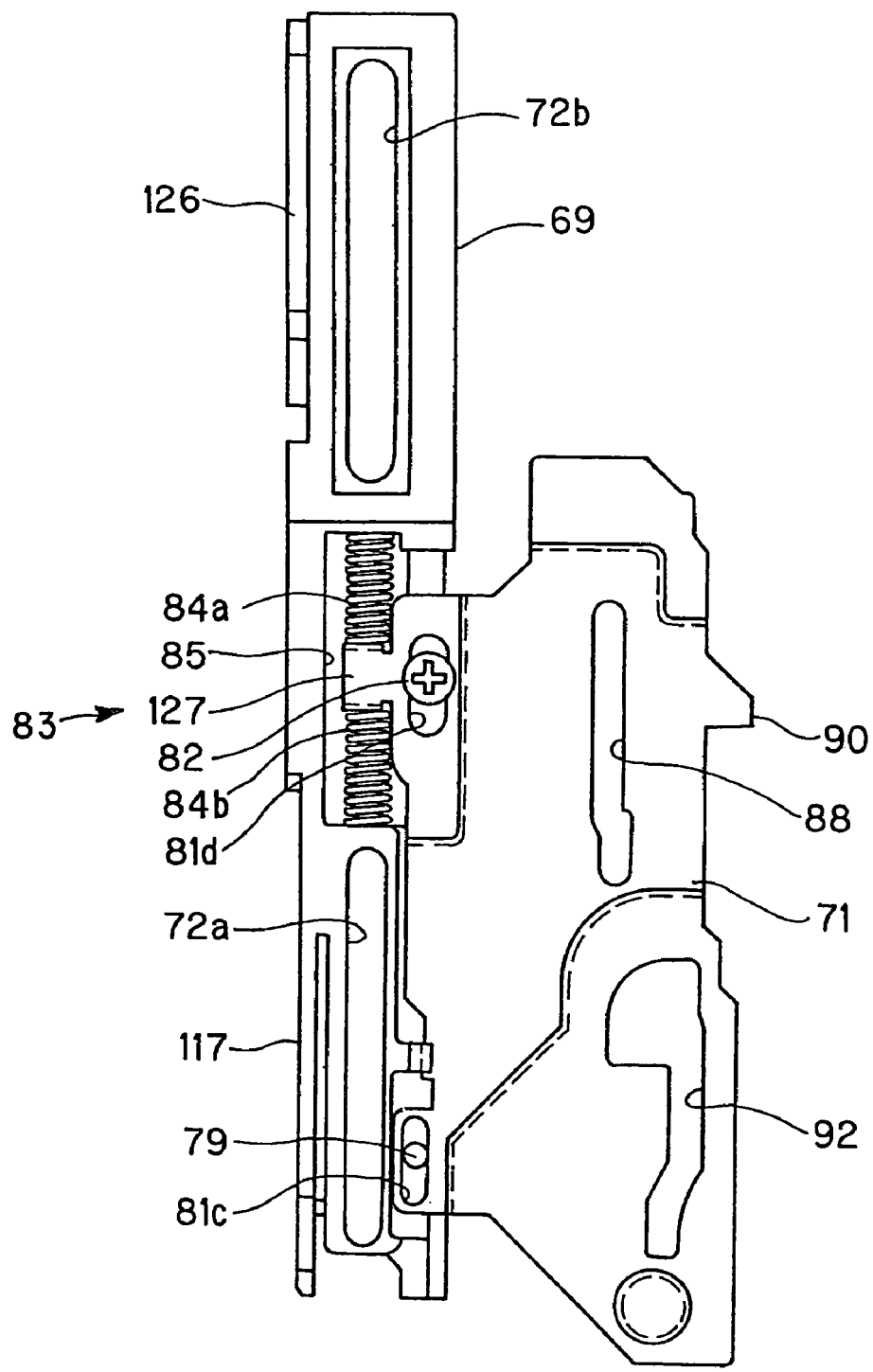
FIG. 33 is a plan view of a variant of the shock absorbing mechanism.

Also in the disk drive 1, the shock absorbing mechanism 83 may be so constructed that the space between the first and second helical compression springs 84*a* and 84*b* held in the retention hole 85 in the driving lever 69 is maintained by a holder 127 provided on the moving plate 71 as shown in FIG. 33 for example.

In the above construction, the first helical compression spring 84*a* as a first shock absorbing member is held at the rear end thereof on the moving plate 71 and at the front end on the driving lever 69. On the other hand, the second helical compression spring 84*b* as a second shock absorbing member is held at the front end thereof on the moving plate 71 and at the rear end on the driving lever 69.

Thus, in the disk drive 1, when the driving lever 69 is moved by the driving lever movement driving mechanism 70 in the direction in which the optical disk 2 is introduced, a difference in movement between the driving lever 69 and moving plate 71, caused by an external force applied to the optical disk 2 introduced into the housing 3 through the disk slot 21 in a direction opposite to the direction in which the optical disk 2 is introduced, is absorbed by the first helical compression spring 84*a*. When the driving lever 69 is moved by the driving lever movement driving mechanism 70 in the direction in which the optical disk 2 is ejected, a difference in movement between the driving lever 69 and moving plate 71, caused by an external force applied to the optical disk 2 ejected to outside the housing 3 through the disk slot 21 in a direction opposite to the direction in which the optical disk 2 is ejected, is absorbed by the second helical compression spring 84*b*.

Further, the first and second helical compression springs 84*a* and 84*b* may be a single helical compression spring interposed between the driving lever 69 and moving plate 71. In this case, the helical compression springs 84 are held in the retention hole 85 in the driving lever 69 with the middle portion thereof being held by the holder 127 provided on the moving plate 71.

Also in the above case, the helical compression spring can absorb a difference in movement between the driving lever 69 and moving plate 71, caused by an external force applied to the optical disk 2 ejected to outside the housing 3 through the disk slot 21 in a direction opposite to the direction in which the optical disk 2 is ejected when the driving lever 69 is moved by the driving lever movement driving mechanism 70 in the direction in which the optical disk 2 is ejected, and a difference in movement between the driving lever 69 and moving plate 71, caused by an external force applied to the optical disk 2 introduced into the housing 3 through the disk slot 21 in a direction opposite to the direction in which the optical disk 2 is introduced when the driving lever 69 is moved by the driving lever movement driving mechanism 70 in the direction in which the optical disk 2 is introduced.

Note that the present invention is not limited to the slot-in type disk drive 1 installed in the aforementioned notebook-sized personal computer 1000, but it is widely applicable to disk drives which write and/or read information signals to or from an optical disk.

What is claimed is:

1. A disk drive comprising:
 a device housing having formed at the front side thereof a disk slot through which an optical disk is to be loaded and removed;
 a base unit having provided integrally on a base thereof:
 a disk mount on which the optical disk introduced into the device inside through the disk slot is to be set;
 a disk rotation driving mechanism that spins the optical disk placed on the disk mount;
 an optical pickup that writes and/or reads signals to and/or from an optical disk being spun by the disk rotation driving mechanism; and
 a pickup feeding mechanism that moves the optical pickup over the optical disk between the inner and outer circumference of the latter;
 a disk transport mechanism including a plurality of pivotable members each having formed at the free end thereof an abutment that abuts the periphery of the optical disk introduced through the optical disk slot and pivotably supported at the base end thereof, the plurality of pivotable members loading the optical disk by bringing the optical disk introduced through the disk slot to a disk setting position where the optical disk is to be placed on the disk mount and ejecting the optical disk by bringing the optical disk to outside the device housing through the disk slot; and
 a base lifting mechanism that vertically moves the base between a disk chucking position where it will elevate the base to place the optical disk once set in the disk setting position onto the disk mount and a disk releasing position where it will lower the base to remove the optical disk from on the disk mount,
 the base lifting mechanism making a first disk chucking operation by elevating at least the base to the disk chucking position to place the optical disk on the disk mount, and a second disk chucking operation by lowering the base to an intermediate position between the disk chucking and releasing positions, rotating the optical disk by means of the disk rotation driving mechanism, shifting the optical disk to another phase, and then elevating the base again to the disk chucking position to place the optical disk on the disk mount.

2. The device according to claim 1, wherein after completion of the first disk chucking operation, the base lifting mechanism shifts the optical disk to a phase of about 180 deg. from its position to make the second disk chucking operation.

3. The device according to claim 1, wherein:
 the disk mount includes:
 a turn table which is rotated by the disk rotation driving mechanism;
 an engagement protrusion formed in the center of the turn table and engaged into a central hole formed in the optical disk; and
 a plurality of engagement claws which rests on the periphery of the central hole in the optical disk in which the engagement protrusion is engaged, and
 wherein the device housing includes:
 an opening formed in a top plate thereof opposite to the disk mount and through which the engagement protrusion is exposed to outside during the disk chucking operation; and
 an abutment projection formed on the top plate along the periphery of the opening to extend toward the disk mount,
 when the base is elevated to the disk chucking position, the base lifting mechanism making the disk chucking operation to place the optical disk on the disk mount by forcing the periphery of the central hole in the optical disk to the abutment projection of the top plate with the engagement protrusion being introduced into the central hole in the optical disk placed in the disk setting position, so that the optical disk will be held on the turn table with the engagement protrusion being engaged in the central hole in the optical disk while the plurality of engagement claws is resting on the periphery of the central hole in the optical disk.

4. The device according to claim 1, further comprising a lifting member provided on the bottom of the device housing to project upward from near the disk mount,
 when the base is lowered to the disk releasing position, the base lifting mechanism making the disk releasing operation to release the optical disk from on the disk mount while elevating the optical disk by abutting the free end of the lifting member to a no-signal recording area inside the inner circumference of the optical disk placed on the disk mount.

5. The device according to claim 1, wherein signal write and/or read is made to and/or from the optical disk with the base being kept at the intermediate position.

* * * * *